(12) United States Patent
Rattner

(10) Patent No.: US 9,445,248 B2
(45) Date of Patent: Sep. 13, 2016

(54) RADIO-AGNOSTIC MESSAGE TRANSLATION SERVICE

(71) Applicant: QUALCOMM Incorporated, San Diego, CA (US)

(72) Inventor: Zachary David Rattner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 14/341,042

(22) Filed: Jul. 25, 2014

(65) Prior Publication Data

US 2016/0029190 A1    Jan. 28, 2016

(51) Int. Cl.
| | | |
|---|---|---|
| H04W 40/00 | (2009.01) | |
| H04W 4/18 | (2009.01) | |
| H04L 12/26 | (2006.01) | |
| H04B 5/00 | (2006.01) | |
| H04W 48/18 | (2009.01) | |
| G06F 17/28 | (2006.01) | |
| H04W 4/00 | (2009.01) | |
| H04W 4/12 | (2009.01) | |
| H04W 76/02 | (2009.01) | |
| H04W 88/16 | (2009.01) | |
| H04W 92/02 | (2009.01) | |
| H04W 88/06 | (2009.01) | |

(52) U.S. Cl.
CPC ............... *H04W 4/18* (2013.01); *G06F 17/28* (2013.01); *H04B 5/0031* (2013.01); *H04L 43/08* (2013.01); *H04W 4/008* (2013.01); *H04W 4/12* (2013.01); *H04W 48/18* (2013.01); *H04W 76/02* (2013.01); *H04W 88/16* (2013.01); *H04W 92/02* (2013.01); *H04W 88/06* (2013.01)

(58) Field of Classification Search
CPC . H04W 84/047; H04W 16/26; H04W 88/04; H04W 28/18; H04W 40/22; H04W 88/085; H04W 52/40; H04B 7/2606; H04B 7/15507; H04B 7/15542; H04B 7/15; H04B 7/15592; H04B 7/15528; H04B 7/15535; H04B 7/15557
USPC ....... 455/11.1, 13.1, 445, 456.2, 550.1, 12.1, 455/444; 370/315, 338, 492; 342/15, 353
See application file for complete search history.

(56) References Cited

U.S. PATENT DOCUMENTS

| 7,340,769 B2 | 3/2008 | Baugher et al. |
| 7,386,010 B2 | 6/2008 | Solomon et al. |

(Continued)

OTHER PUBLICATIONS

International Search Report and Written Opinion—PCT/US2015/041187—ISA/EPO—Oct. 28, 2015.

*Primary Examiner* — Fred Casca
(74) *Attorney, Agent, or Firm* — Loza & Loza LLP

(57) ABSTRACT

In various aspects, the disclosure provides a hub that is adapted for radio-agnostic message translation. The hub may be configured to establish a connection with a target device using a first network access technology, receive a first message from a first client device through a connection established on a second network access technology, translate the first message from a first transmission format to obtain a second message in a second transmission format, and transmit the second message to the target device and using the first network access technology. The first network technology may employ a first wireless technology having a range that is less than 100 meters. The first client device may be separated from the target device by a distance that is greater than the range of the first wireless technology.

27 Claims, 14 Drawing Sheets

(56) References Cited

U.S. PATENT DOCUMENTS

| | | |
|---|---|---|
| 8,032,353 B1 | 10/2011 | Baron et al. |
| 8,359,013 B2 | 1/2013 | Yach et al. |
| 2003/0177245 A1 | 9/2003 | Hansen |
| 2010/0131687 A1 | 5/2010 | Li et al. |
| 2011/0044218 A1 | 2/2011 | Kaur et al. |
| 2012/0151561 A1* | 6/2012 | Kreiner ............... H04L 12/1845 726/4 |
| 2012/0176927 A1* | 7/2012 | Takano ............... H04B 7/15507 370/252 |
| 2013/0083678 A1 | 4/2013 | Yin |
| 2014/0237259 A1* | 8/2014 | Karabinis ................ H04K 3/25 713/189 |
| 2015/0163840 A1* | 6/2015 | Ji ........................ H04W 76/023 455/426.1 |

* cited by examiner

RADIO-AGNOSTIC MESSAGE TRANSLATION SERVICE

TECHNICAL FIELD

Aspects of the present disclosure relate generally to wireless communication systems, and more particularly, to systems and methods for providing radio-agnostic message translation services.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

In some applications, the use of wide area radio access technologies may be impractical due to limitations on power budgets and/or constraints on battery life. Many devices installed in residences, businesses and vehicles are now provisioned or retrofitted with control and monitoring devices that can communicate wirelessly using a low-energy radio access technology to enable connection to other devices. For example, sensors, light bulbs, audio visual equipment, security system devices, appliances and other devices may be equipped for low-energy, short-range radio communications that operate with dissipation using near-field communications (NFC) and Bluetooth technologies. In one example, low-energy devices may communicate using Bluetooth in the 2.4 GHz industrial, scientific and medical (ISM) band.

Low-energy devices may be used in application environments where the amount of energy that is available is limited, such as in battery-powered devices. Low-energy devices frequently have a limited communication range to conserve battery. For example, sensors utilizing Bluetooth Low Energy (BLE) to communicate with other devices or sensors typically have a communication range on the order of thirty meters. Smartphones and computing devices may be capable of communicating with nearby devices using Bluetooth or NFC networking, but mobile devices that are in motion may often be beyond the range of the low-energy, short-range radio networks.

In some instances, it may be desirable to communicate with a low-energy device that is located at a distance that is greater than the communication range of the low-energy device. Conventional methods of communicating with remote sensors may require that the sensor be configured to upload sensor data to a server (e.g., a cloud server) from which sensor data can be retrieved through the Internet. This approach is associated with higher cost, greater overall resource usage and increased complexity. These issues may preclude direct access to a monitored device in a manner that permits a client device to exercise real-time control with respect to the sensor.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

The disclosure describes systems, apparatus and methods that may be adapted for radio-agnostic message translation. In various aspects, the disclosure provides a method of communications that includes establishing a connection with a first device that communicates using a first networking technology that has a limited transmission range, receiving a first message from a first client through a connection established on a communications network, and transmitting the second message to the first device using the first networking technology. The first client may be separated from the first device by a distance that is greater than the transmission range of the first networking technology. In one example, the first network technology includes a first wireless technology having a range that is less than 100 meters. In another example the first wireless technology having a range that is less than 35 meters. In another example the first wireless technology having a range that is less than one meter.

According to certain aspects, the first message is translated from a first transmission format and the second message is provided in a second transmission format. Addressing information of the first device may be concealed from the first client.

In one aspect, the first message may be directed to a group of devices. For example, the first networking technology may be used to transmit the second message to a plurality of similar devices in the group of devices. In another example, the first message may be directed to a group of devices that includes the first device and also includes a second device that communicates using a second networking technology that has a limited transmission range. The second networking technology may be used to transmit the second message to a plurality of devices. The group of devices may include devices of the same type, function or class.

In one aspect, a third message may be received from a second client through a wide area network. The second client may be separated from the first device by a distance that is greater than the transmission range of the first networking technology. The third message may be translated to obtain a fourth message. Transmission of the second message and the fourth message may be scheduled such that the second message and the fourth message are transmitted sequentially, without an overlap or interleave. In one example, at least a portion of the first message may be received while the third message is being received. Transmission of the second message may be completed before transmitting the fourth message, or transmission of the fourth message may be completed before transmitting the second message.

In one aspect, a third message may be received from the first device. The third message may be translated to obtain a fourth message, and the fourth message may be provided to the first client. Translating the third message includes associating the third message with a preceding communication from the first client, and translating the fourth message to a format consistent with the preceding communication, based on the associating.

In one aspect, a third message is received from the first device. Responsive to receipt of the third message, a fourth message corresponding to the third message may be transmitted to one or more other devices that communicate using the first networking technology.

In one aspect, the first message is directed to a first group of devices comprising a plurality of devices configured to use the first networking technology. A command for each device in the first group of devices may be determined based on content of the message. The command may be transmitted to a corresponding device using the first networking technology. The first group of devices comprises different types of devices. Different commands may be determined for the different types of devices.

In one aspect, the first message may be translated by converting the first message from a first transmission format to a second transmission format.

In one aspect, the first wireless technology comprises a Bluetooth technology, a near field communications technology, a Wi-Fi technology and/or a Power-line communications technology.

In various aspects, the disclosure provides an apparatus configured for wireless communication that has at least one processor, a memory coupled to the at least one processor, and first and second wireless communication interfaces coupled to the at least one processor. The at least one processor may be configured to establish a connection with a first device that communicates using a first networking technology that has a limited transmission range, receive a first message from a first client through a connection established on a communications network, translate the first message to obtain a second message, and transmit the second message to the first device using the first networking technology. The first client may be separated from the first device by a distance that is greater than the transmission range of the first networking technology In various aspects, the disclosure provides an apparatus configured for wireless communication, The apparatus may include means for establishing a connection with a first device that communicates using a first networking technology that has a limited transmission range, means for receiving a first message from a first client through a connection established on a communications network, means for translating the first message to obtain a second message, and means for transmitting the second message to the first device using the first networking technology. The first client may be separated from the first device by a distance that is greater than the transmission range of the first networking technology.

In various aspects, the disclosure provides a computer-readable storage medium. The storage medium may include transitory and/or non-transitory storage. The storage medium may include data and instructions, including code for establishing a connection with a first device that communicates using a first networking technology that has a limited transmission range, receiving a first message from a first client through a connection established on a communications network, translating the first message to obtain a second message, and transmitting the second message to the first device using the first networking technology. The first client may be separated from the first device by a distance that is greater than the transmission range of the first networking technology.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Certain aspects disclosed herein relate to a hub that may be used to permit remote control, monitoring and communication with devices that communicate through short-range wireless communications technologies or networks. Short-range wireless communications networks may have limited communication range by design or by configuration. In one example, a wireless communication network may have limited routing capabilities, or routing capabilities that have been blocked or otherwise disabled. Accordingly, a short-range wireless communications network may include devices that employ short-range wireless communications technologies such as NFC or Bluetooth, wired communications technologies such as Power-Line Ethernet and/or longer range wireless communications technologies upon which range limitations have been placed for security reasons. For example, a Wi-Fi local area network may be implemented using wireless local area network (WLAN) technologies that are based on the Institute of Electrical and Electronics Engineers' (IEEE) 802.11 standards. The Wi-Fi network may be deployed without routing capabilities such that communication with other networks is prevented. Such Wi-Fi and other networks may be limited for security reasons when, for example, it is desirable to prevent exposure of the IP address of a Wi-Fi device to the Internet.

A hub provided according to certain aspects disclosed herein may be configured to manage a radio-agnostic message translation service that receives messages from a client device, and translates the messages for transmission to the monitored or controlled device. The hub may be configurable to reliably manage communications between multiple client devices and multiple controlled or monitored devices. The controlled or monitored devices may be grouped and/or profiled such that commands may be addressed to the group and executed by individual remotely controlled devices in accordance with device capabilities.

Figure 1:
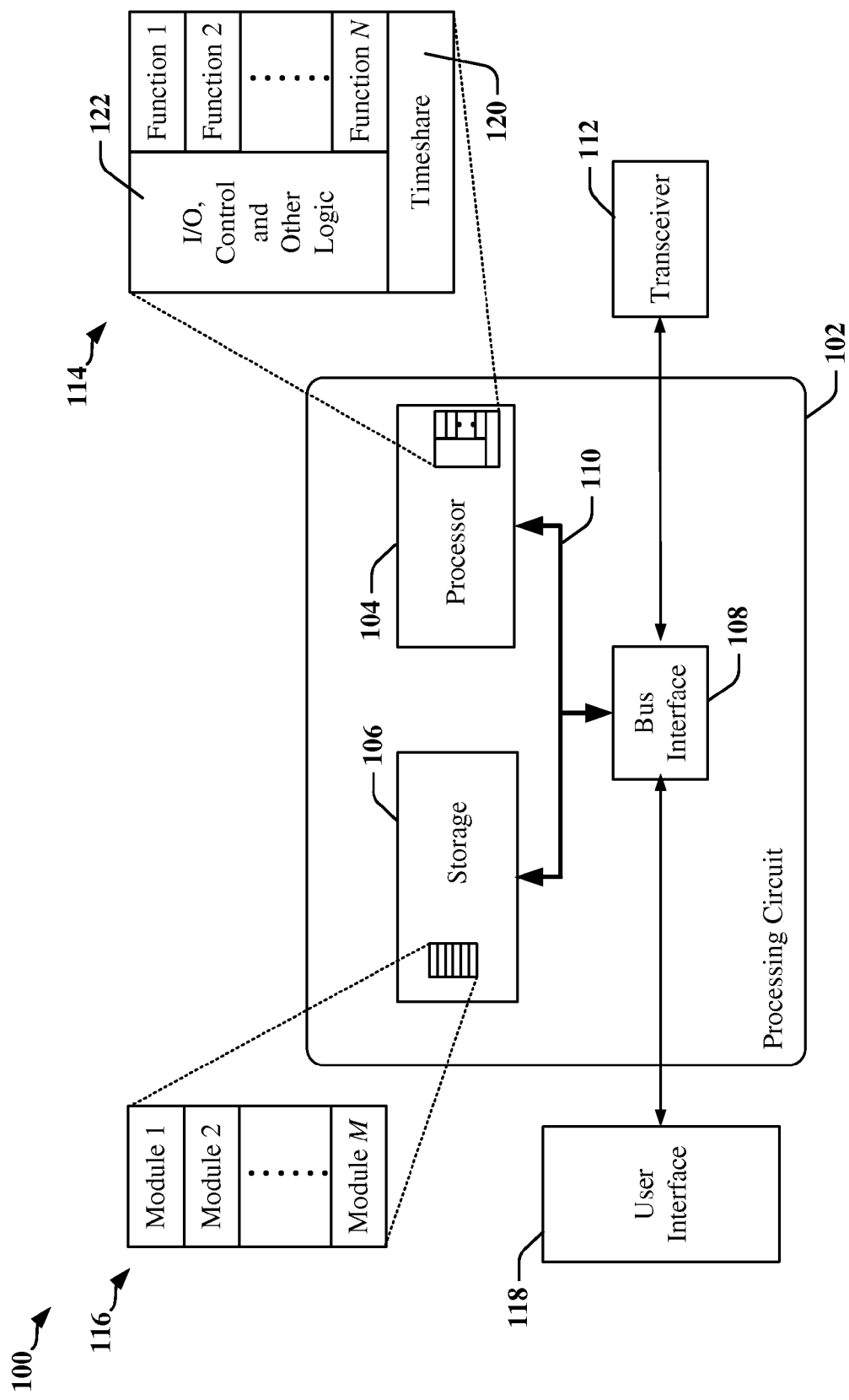
FIG. 1 is a block diagram illustrating an example of an apparatus employing a processing system that may be adapted according to certain aspects disclosed herein.

FIG. 1 is a conceptual diagram 100 illustrating a simplified example of a hardware implementation for an apparatus employing a processing circuit 102 that may be configured to perform one or more functions disclosed herein. In accordance with various aspects of the disclosure, an element, or any portion of an element, or any combination of elements as disclosed herein for managing radio-agnostic message translation services may be implemented using the processing circuit 102. The processing circuit 102 may include one or more processors 104 that are controlled by some combination of hardware and software modules. Examples of processors 104 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 104 may include specialized processors that perform specific functions, and that may be configured, augmented or controlled by one of the software modules 116. For example, the processing circuit may be configured as channel processors, frame processors and other processors that are adapted to handle encoding and decoding of data for transmission on one or more wireless networks. The one or more processors 104 may be configured through a combination of software modules 116 loaded during initialization, and may be further configured by loading or unloading one or more software modules 116 during operation.

In the illustrated example, the processing circuit 102 may be implemented with a bus architecture, represented generally by the bus 110. The bus 110 may include any number of interconnecting buses and bridges depending on the specific application of the processing circuit 102 and the overall design constraints. The bus 110 links together various circuits including the one or more processors 104, and storage 106. Storage 106 may include memory devices and mass storage devices, and may be referred to herein as computer-readable media. The bus 110 may also link various other circuits such as timing sources, timers, peripherals, voltage regulators, and power management circuits. A bus interface 108 may provide an interface between the bus 110 and one or more transceivers 112. A transceiver 112 may be provided for each networking technology supported by the processing circuit. In some instances, multiple networking technologies may share some or all of the circuitry or processing modules found in a transceiver 112. Each transceiver 112 provides a means for communicating with various other apparatus over a transmission medium. Depending upon the nature of the apparatus, a user interface 118 (e.g., keypad, display, speaker, microphone, joystick) may also be provided, and may be communicatively coupled to the bus 110 directly or through a bus interface 108.

A processor 104 may be responsible for managing the bus 110 and for general processing that may include the execution of software stored in a computer-readable medium that may include the storage 106. In this respect, the processing circuit 102, including the processor 104, may be used to implement any of the methods, functions and techniques disclosed herein. The storage 106 may be used for storing data that is manipulated by the processor 104 when executing software, and the software may be configured to implement any one of the methods disclosed herein.

One or more processors 104 in the processing circuit 102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 106 or in an external computer readable medium. The computer-readable medium and/or storage 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 106 may also include, by way of example, a carrier wave, a transmission line, and any other suitable medium for transmitting software and/or instructions that may be accessed and read by a computer. Computer-readable medium and/or the storage 106 may reside in the processing circuit 102, in the processor 104, external to the processing circuit 102, or be distributed across multiple entities including the processing circuit 102. The computer-readable medium and/or storage 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 106 may maintain software maintained and/or organized in loadable code segments, modules, applications, programs, etc., which may be referred to herein as software modules 116. Each of the software modules 116 may include instructions and data that, when installed or loaded on the processing circuit 102 and executed by the one or more processors 104, contribute to a run-time image 114 that controls the operation of the one or more processors 104. When executed, certain instructions may cause the processing circuit 102 to perform functions in accordance with certain methods, algorithms and processes described herein.

Some of the software modules 116 may be loaded during initialization of the processing circuit 102, and these software modules 116 may configure the processing circuit 102 to enable performance of the various functions disclosed herein. For example, some software modules 116 may configure internal devices and/or logic circuits 122 of the processor 104, and may manage access to external devices such as the transceiver 112, the bus interface 108, the user interface 118, timers, mathematical coprocessors, and so on. The software modules 116 may include a control program and/or an operating system that interacts with interrupt handlers and device drivers, and that controls access to various resources provided by the processing circuit 102. The resources may include memory, processing time, access to the transceiver, the user interface 118, and so on.

One or more processors 104 of the processing circuit 102 may be multifunctional, whereby some of the software modules 116 are loaded and configured to perform different functions or different instances of the same function. The one or more processors 104 may additionally be adapted to manage background tasks initiated in response to inputs from the user interface 118, the transceiver 112, and device drivers, for example. To support the performance of multiple functions, the one or more processors 104 may be configured to provide a multitasking environment, whereby each of a plurality of functions is implemented as a set of tasks serviced by the one or more processors 104 as needed or desired. In one example, the multitasking environment may be implemented using a timesharing program 120 that passes control of a processor 104 between different tasks, whereby each task returns control of the one or more processors 104 to the timesharing program 120 upon completion of any outstanding operations and/or in response to an input such as an interrupt. When a task has control of the one or more processors 104, the processing circuit is effectively specialized for the purposes addressed by the function associated with the controlling task. The timesharing program 120 may include an operating system, a main loop that transfers control on a round-robin basis, a function that allocates control of the one or more processors 104 in accordance with a prioritization of the functions, and/or an interrupt driven main loop that responds to external events by providing control of the one or more processors 104 to a handling function.

Examples of Wireless Telecommunications Networking

The various concepts presented throughout this disclosure may be applicable to a broad variety of telecommunication systems, network architectures, and communication standards. In particular, a communication network range extension hub may receive messages from a client device that may be embodied in a mobile wireless communications device. The messages may be transmitted through packet data services obtained through a wireless access network, and through the Internet or another public or private data network.

Figure 2:
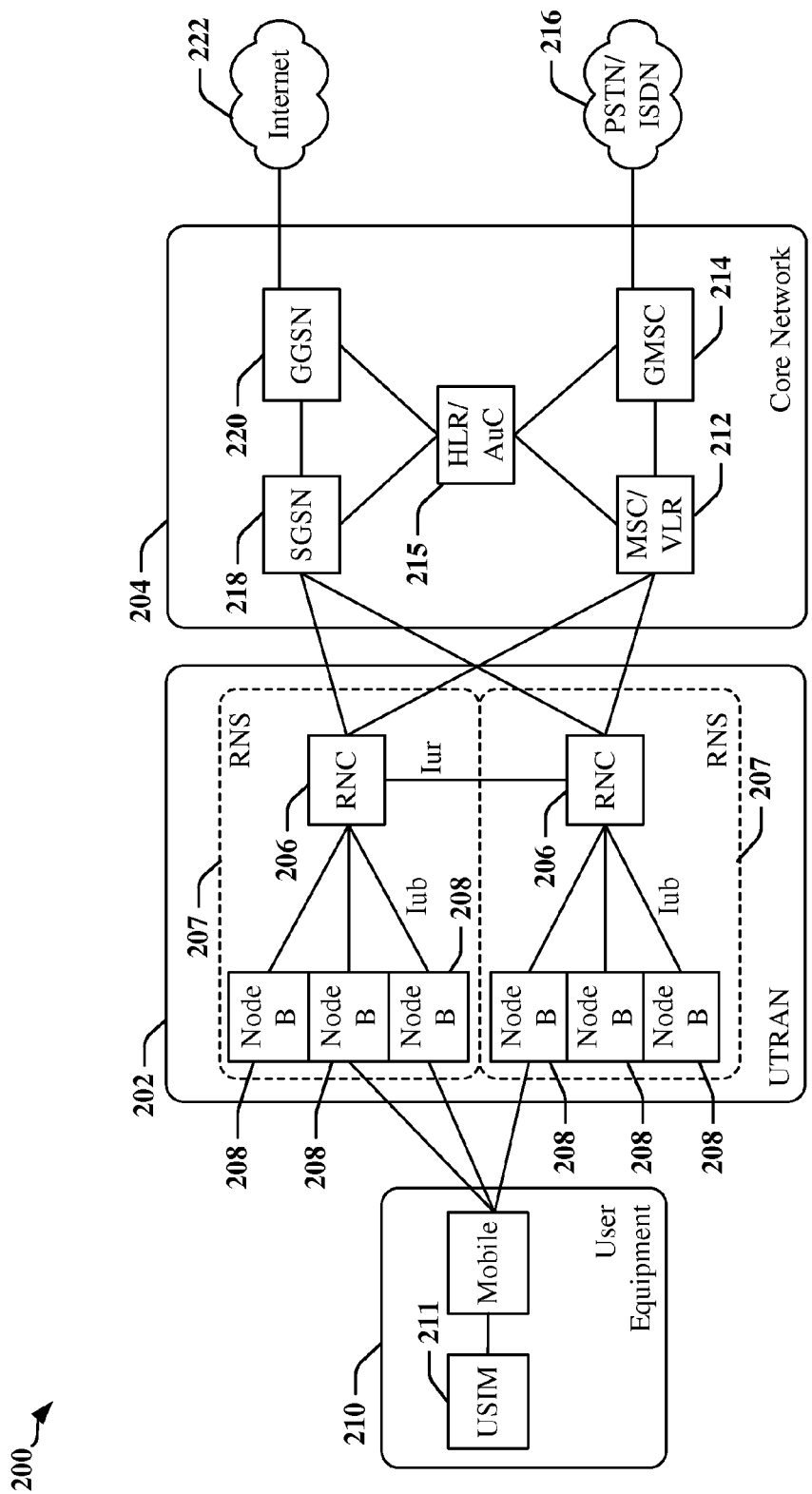
FIG. 2 is a conceptual diagram illustrating a first example of a telecommunications system.

FIG. 2 illustrates one example of a wireless networking environment, among the various possible examples. In the example depicted, various aspects of the present disclosure are illustrated with reference to a Universal Mobile Telecommunications System (UMTS) 200. A UMTS 200 includes three interacting domains: a core network 204, a RAN (e.g., the UTRAN) 202, and a UE 210. Among several options available for the illustrated example, the UTRAN 202 may employ a W-CDMA air interface for enabling various wireless services including telephony, video, data, messaging, broadcasts, and/or other services. The UTRAN 202 may include a plurality of Radio Network Subsystems (RNSs) 207, each controlled by a respective Radio Network Controller (RNC) 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each depicted RNS 207; however, the RNSs 207 may include any number of wireless Node Bs 208. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device.

The mobile apparatus is commonly referred to as user equipment or UE 210 in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS, the UE 210 may further include a universal subscriber identity module (USIM) 211, which contains a user's subscription information to a network. The UE 210 may include a plurality of USIMs 211. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs 210 with access to types of core networks other than UMTS core networks 204.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, such as Equipment Identity Register (EIR), a VLR, a home location register (HLR), and/or an authentication center (AuC) may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs 206 may be connected to the MSC 212. The MSC 212 is an apparatus that controls call setup, call routing, and UE mobility functions. The MSC 212 also includes a VLR that contains subscriber-related information for the duration that a UE 210 is in the coverage area of the MSC 212. The GMSC 214 provides a gateway through the MSC 212 for the UE 210 to access a circuit-switched network 216. The GMSC 214 includes an HLR 215 containing subscriber data, such as the data reflecting the details of the services to which a particular user has subscribed. The HLR 215 is also associated with an AuC that contains subscriber-specific authentication data. When a call is received for a particular UE 210, the GMSC 214 queries the HLR 215 to determine the location of the UE 210 and forwards the call to the particular MSC 212 serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

Figure 3:
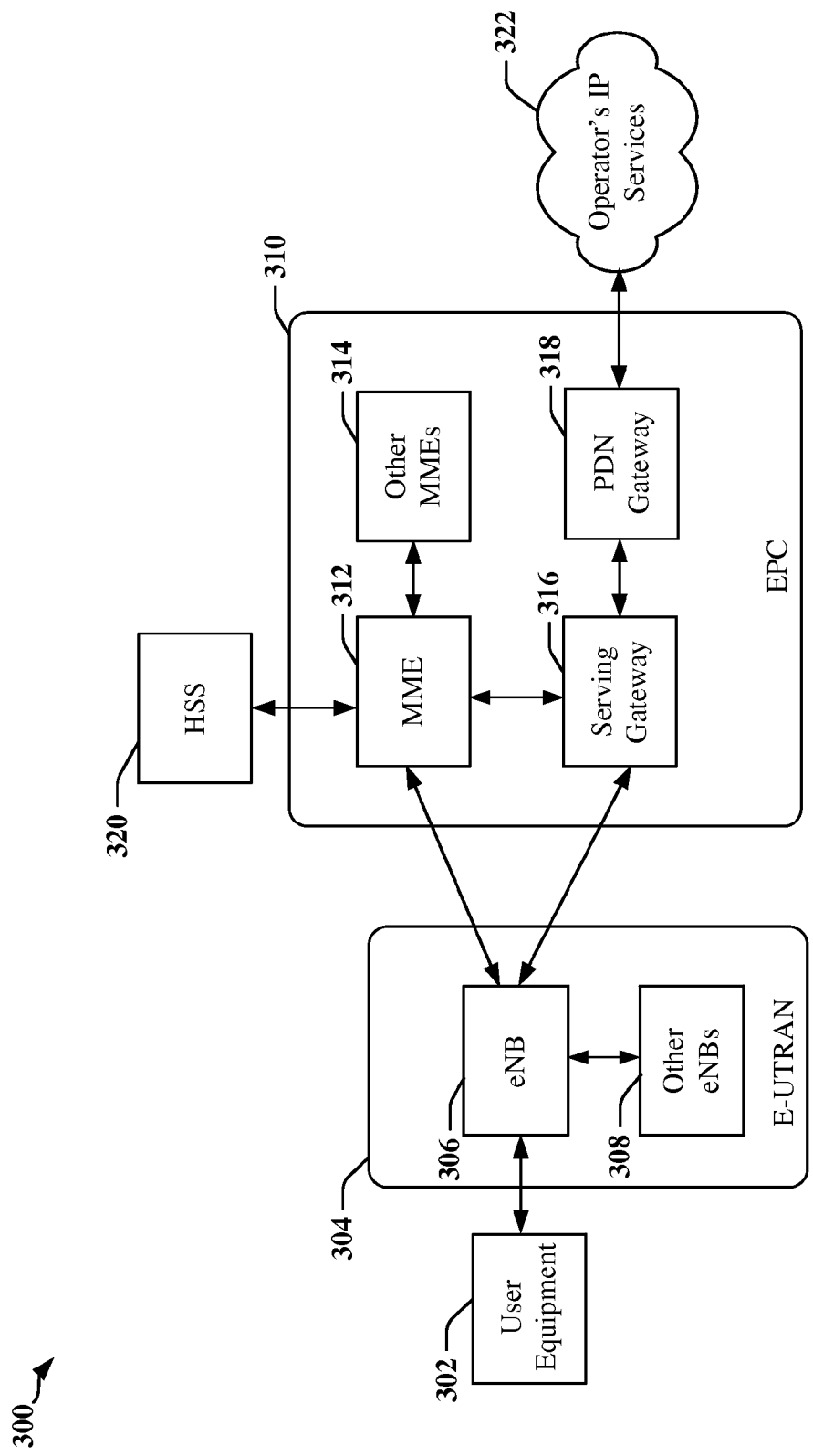
FIG. 3 is a conceptual diagram illustrating a second example of a telecommunications system.

The UTRAN 202 is but one example of a RAN that may be utilized in accordance with the present disclosure. Other examples may include Long Term Evolution (LTE), which provides a set of enhancements to the UMTS mobile standard promulgated by the 3GPP. FIG. 3 is a diagram illustrating a simplified example of an LTE network architecture employing various apparatuses 100 (see the processing circuit of FIG. 1, for example). The LTE network architecture may be referred to as an Evolved Packet System (EPS) 300. The EPS 300 may include one or more user equipment (UE) 302, an Evolved UMTS Terrestrial Radio Access Network (E-UTRAN) 304, an Evolved Packet Core (EPC) 310, a Home Subscriber Server (HSS) 320, and an Operator's IP Services 322. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 306 and other eNBs 308. The eNB 306 provides user and control plane protocol terminations toward the UE 302. The eNB 306 may be connected to the other eNBs 308 through a backhaul interface. The eNB 306 may also be referred to by those skilled in the art as a base station, a base transceiver station, a radio base station, a radio transceiver, a transceiver function, a basic service set (BSS), an extended service set (ESS), or some other suitable terminology. The eNB 306 provides an access point to the EPC 310 for a UE 302. Examples of UEs 302 include a cellular phone, a smart phone, a tablet, a session initiation protocol (SIP) phone, a laptop, a personal digital assistant (PDA), a satellite radio, a global positioning system, a multimedia device, a video device, a digital audio player (e.g., MP3 player), a wearable computing device, an appliance, a camera, a game console, or any other similar functioning device. The UE 302 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 306 is connected by an S1 interface to the EPC 310. The EPC 310 includes a Mobility Management Entity (MME) 312, other MMEs 314, a Serving Gateway 316, and a Packet Data Network (PDN) Gateway 318. The MME 312 is the control node that processes the signaling between the UE 302 and the EPC 310. Generally, the MME 312 provides bearer and connection management. All user IP packets are transferred through the Serving Gateway 316, which itself is connected to the PDN Gateway 318. The PDN Gateway 318 provides UE IP address allocation as well as other functions. The PDN Gateway 318 is connected to the Operator's IP Services 322. The Operator's IP Services 322 include the Internet, the Intranet, an IP Multimedia Subsystem (IMS), and a PS Streaming Service (PSS).

Figure 4:
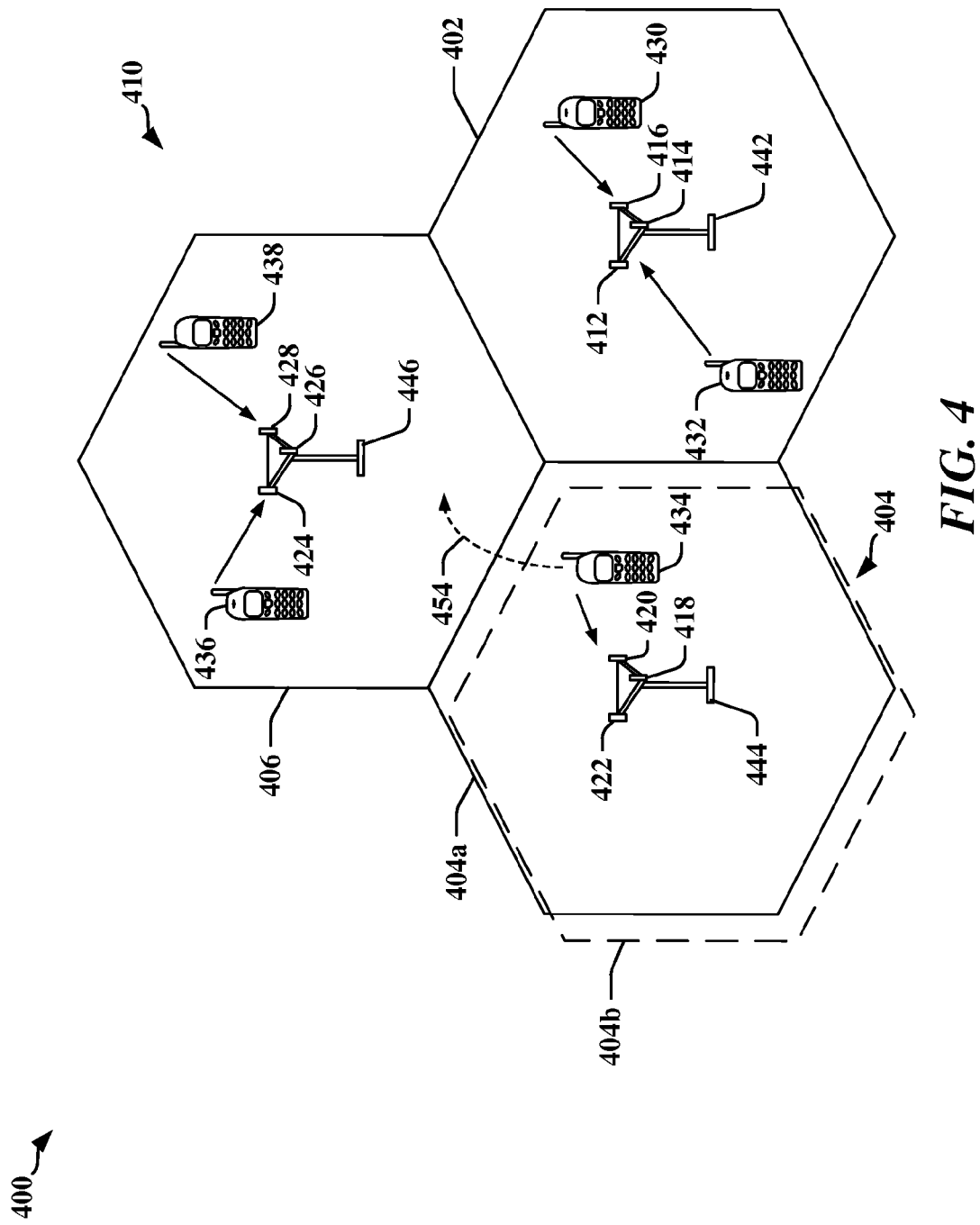
FIG. 4 illustrates an example of an access network.

Referring to FIG. 4, by way of example and without limitation, a simplified schematic illustration of a networking environment 400 that includes RAN 410 that may be implemented as a UTRAN, E-UTRAN, or other such architecture. The RAN 410 may include multiple cellular regions (cells), including cells 402, 404, and 406, each of which may include one or more sectors. Cells may be defined geographically (e.g., by coverage area) and/or may be defined in accordance with a frequency, scrambling code, etc. That is, the illustrated geographically-defined cells 402, 404, and 406 may each be further divided into a plurality of cells, e.g., by utilizing different scrambling codes. For example, cell 404a may utilize a first scrambling code, and cell 404b, while in the same geographic region and served by the same base station 444, may be distinguished by utilizing a second scrambling code. In one example, the base stations 442, 444 and 446 may operate as the Node B 208 of FIG. 2. In another example, the base stations 442, 444 and 446 may operate as the eNB 306, 308 of FIG. 3.

In a cell that is divided into sectors, the multiple sectors within a cell can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 may each correspond to a different sector. In cell 406, antenna groups 424, 426, and 428 may each correspond to a different sector.

The cells 402, 404, and 406 may include several UEs that may be in communication with one or more sectors of each cell 402, 404, or 406. For example, UEs 430 and 432 may be in communication with base station 442, UE 434 may be in communication with base station 444, and UEs 436 and 438 may be in communication with base station 446. Here, each base station 442, 444, and 446 may be configured to provide an access point to a core network 204 (see FIG. 2) for all the UEs 430, 432, 434, 436, and 438 in the respective cells 402, 404, and 406.

Figure 5:
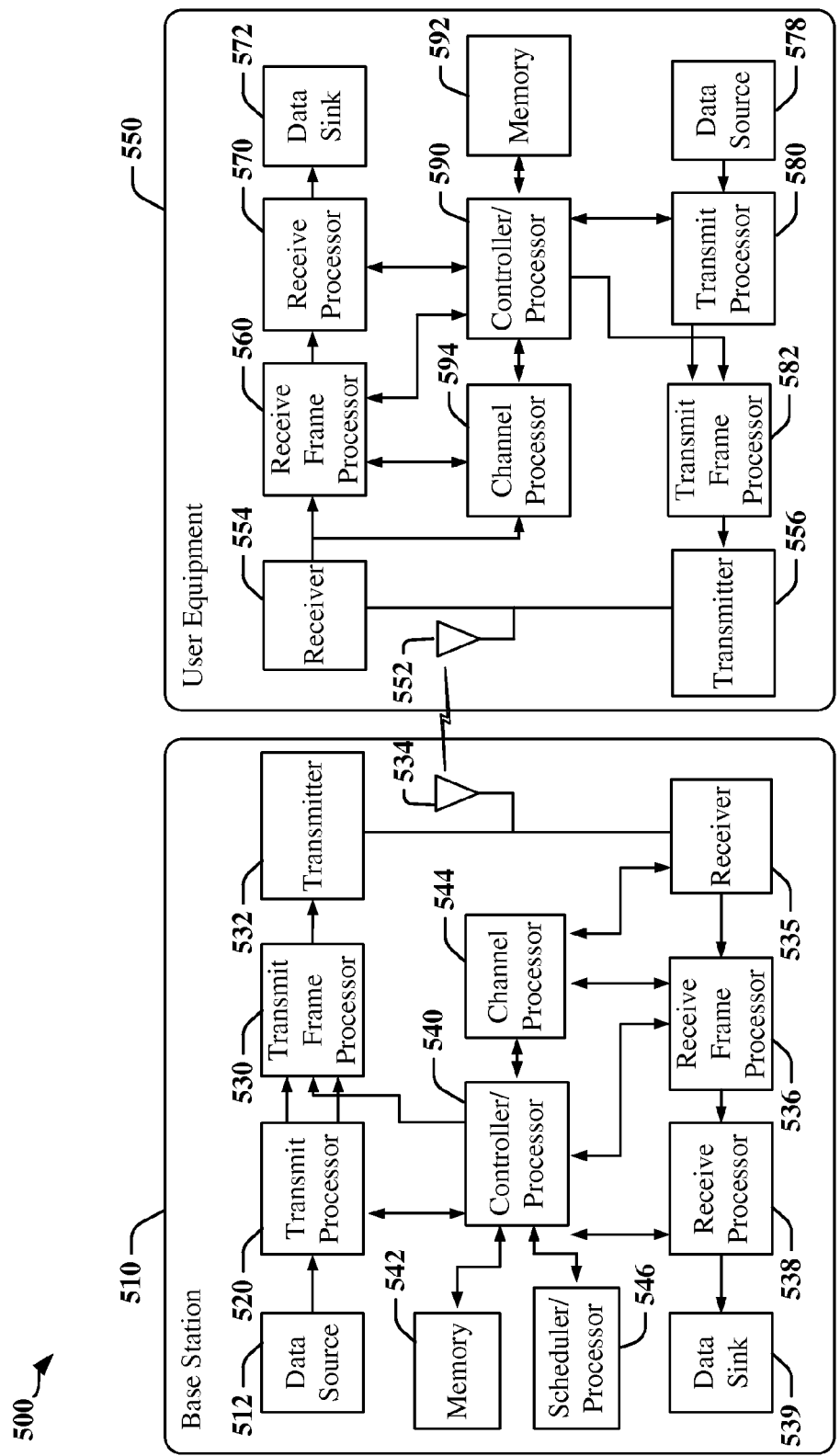
FIG. 5 illustrates an example of a base station in communication with a user equipment in a networking system.

FIG. 5 is a block diagram illustrating an example of a base station 510 in communication with a UE 550, where the base station 510 may be the base station 208 in FIG. 2 or an eNB 306, 308 in FIG. 3, and the UE 550 may be the UE 210 in FIG. 2 or the UE 302 in FIG. 3. Each of the base station 510 and the UE 550 may include one or more processing circuits such as the processing circuit 102 of FIG. 1. In the downlink communication, a transmit processor 520 of the base station 510 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by the controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the base station 510. More specifically, the receive processor 570 descrambles and despreads the symbols, and then determines the most likely signal constellation points transmitted by the base station 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., a display). Control signals carried by successfully decoded frames are provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 in the UE 550, and control signals from the controller/processor 590 are provided to a transmit processor 580. The data source 578 may represent applications running in the UE 550 and various user interfaces (e.g., keyboard). Similar to the functionality described in connection with the downlink transmission by the base station 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the base station 510 or from feedback contained in a midamble transmitted by the base station 510, may be used to select the appropriate coding, modulation, spreading, and/or scrambling schemes. The symbols produced by the transmit processor 580 may be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the base station 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may use an acknowledgement (ACK) and/or negative acknowledgement (NACK) protocol to support retransmission requests for those frames.

The controller/processors 540 and 590 may be used to direct the operation at the base station 510 and the UE 550, respectively. For example, the controller/processors 540 and 590 may provide various functions including timing, peripheral interfaces, voltage regulation, power management, and other control functions. The computer readable media of memories 542 and 592 may store data and software for the base station 510 and the UE 550, respectively. A scheduler/processor 546 at the base station 510 may be used to allocate resources to UEs and schedule downlink and uplink transmissions for the UEs.

In a wireless telecommunication system, the communication protocol architecture may take on various forms depending on the particular application. For example, in a 3GPP UMTS, the signaling protocol stack is divided into a Non-Access Stratum (NAS) and an Access Stratum (AS). The NAS provides the upper layers for signaling between the UE 210 and the core network 204 (referring to FIG. 2), and may include circuit switched and packet switched protocols. The AS provides the lower layers for signaling between the UTRAN 202 and the UE 210, and may include a user plane and a control plane. Here, the user plane or data plane carries user traffic, while the control plane carries control information (i.e., signaling).

Examples of Range-limited Wireless Communications Technologies

Certain aspects of the present disclosure relate to a UE 510 that is adapted to support communication technologies used for interfacing with other devices that are physically in close proximity to the UE 510. Examples of such communication technologies may be based on, for example, Bluetooth communication standards, near field communication (NFC) protocols and data exchange formats, and other wireless technologies including technologies defined in WLAN standards (including the IEEE 802.11 standards for Wi-Fi networks), and wireless personal area network (WPAN) standards. Some of these technologies, including Bluetooth and NFC, are conventionally used for short-range communications, typically in applications that include low power consumption devices.

NFC and Bluetooth are both short-range communication technologies that can provide low-energy communications interfaces for devices that are wirelessly monitored or controlled. NFC and Bluetooth may be integrated into wireless mobile devices. NFC typically operates at slower speeds than Bluetooth, but may consume considerably less power and can provide a less complex method of association between devices. The maximum data transfer rate of NFC may be less than 0.5 Mbit/s, whereas some Bluetooth devices may exchange data at rates of 2.1 1 Megabit per second (Mbit/s). NFC may have a shorter range than Bluetooth. In some instances, NFC is limited to a range of less than 20 cm, whereas certain Bluetooth implementations have a range of up to 100 meters.

NFC provides short-range wireless technologies and protocols for communicating over distances in the order of 10 cm or less. The NFC air interface operates at a radio frequency of 13.56 MHz and can transmit data at rates ranging from 106 Kbit/s to 424 Kbit/s. An NFC initiator generates a radio frequency (RF) field that is usable for powering certain passive targets. When NFC peer-to-peer communication is desired, both devices involved in the communication are typically powered.

The Bluetooth RF interface (physical layer) operates in the unlicensed ISM band at 2.4 GHz. The physical layer may include a frequency-hop transceiver, and RF signaling employs shaped, binary frequency modulation (FM) to minimize transceiver complexity. Data exchanges may be handled at bit rates of between 1 Mb/s and 3 Mb/s for a Basic Rate mode and an Enhanced Data Rate mode, respectively. In operation, a physical radio channel is shared by a group of devices that are synchronized to a common clock and frequency-hopping pattern. One device provides the synchronization reference and is known as the master. All other devices are known as slaves. A group of devices synchronized in this fashion form a piconet.

Figure 6:
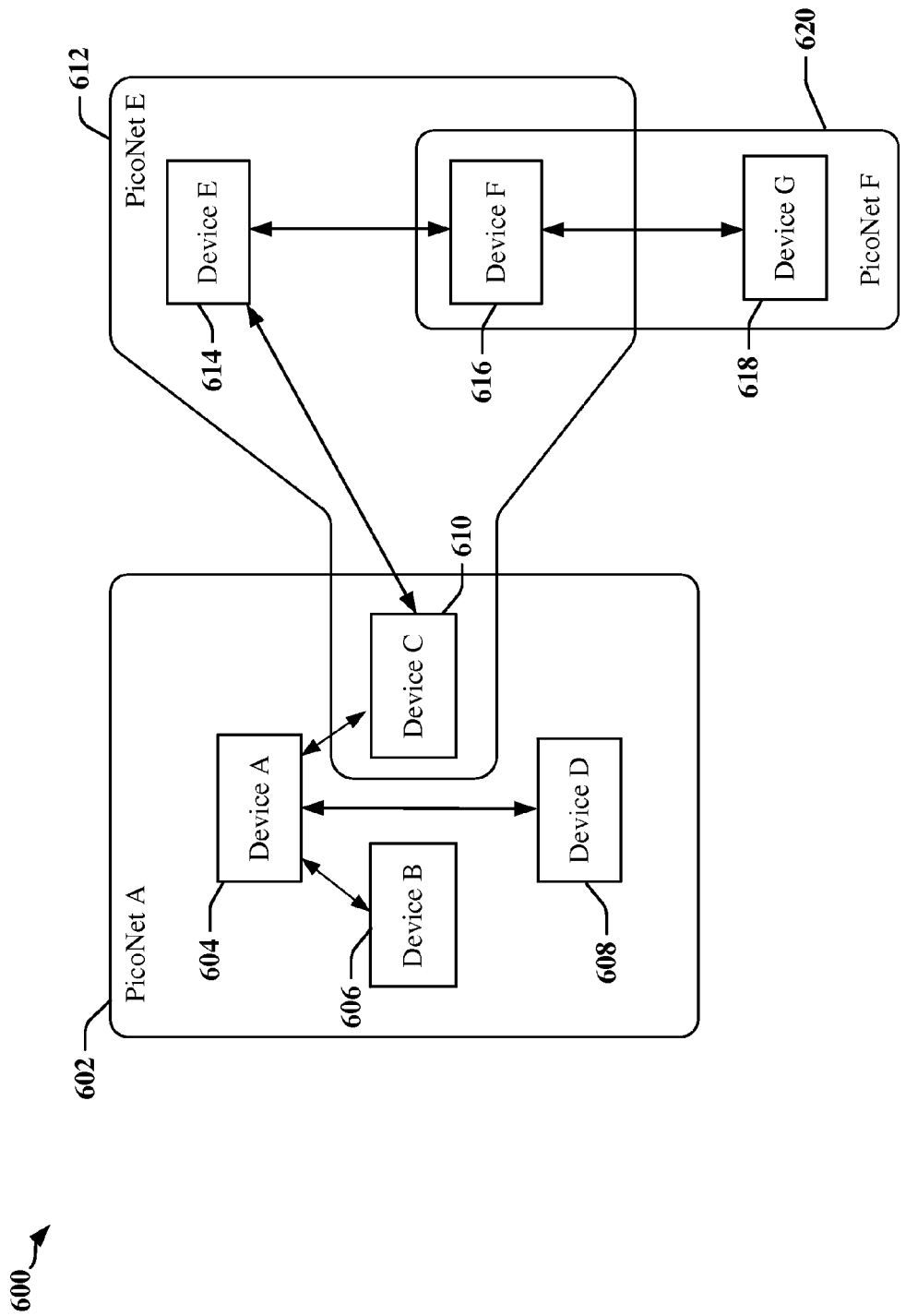
FIG. 6 illustrates an example of a Bluetooth networking environment.

FIG. 6 is a block diagram illustrating an example of a Bluetooth networking environment 600. Bluetooth links are formed within the context of a piconet. A piconet includes of two or more devices that occupy the same physical channel. Devices may occupy the same physical channel when they are synchronized to a common clock and hopping sequence. The common clock for a piconet may be derived from a clock generated used by a Bluetooth transceiver in a master device in the piconet. The hopping sequence may be derived from the master device clock and a Bluetooth device address corresponding to the master device. The other devices in a piconet may be referred to as slave devices for the piconet.

In the example in FIG. 6, three piconets 602, 612 and 620 are defined. A first master device (Device A) 604 is associated with a first piconet (Piconet A) 602, a second master device (Device E) 614 is associated with a second piconet (Piconet E) 612, and a third master device (Device F) 616 is associated with in a third piconet (Piconet F) 620. It will be appreciated that Device F 616 serves as a master device in Piconet F 620 and is a slave device in Piconet E 612. One device (Device C) 610 is a slave device in Piconet A 602 and Piconet E 612. Piconet A includes 3 slave devices 606, 608 and 610.

The three piconets 602, 612 and 620 may coexist in a common physical location. Each piconet 602, 612 or 620 employs a different physical channel from the other piconets 602, 612, 620, using a different master device 604, 614, or 616 to provide a piconet clock and hopping sequence used by the devices 604, 606, 608, 610, 614, 616, and/or 618 in the piconet 602, 612, 620. The frequency hopping pattern may be algorithmically determined from certain fields in the Bluetooth address and the clock of the master device 604, 614, 616. In one example, the hopping pattern is derived from a pseudorandom ordering of frequencies in the ISM band. The physical channel of a piconet may be sub-divided in time as slots, and data packets may be transmitted in these slots. A number of consecutive slots may be allocated to a single packet. A physical link may be formed within the physical channel to support communications between pairs of devices 604, 606, 608, 610, 614, 616, and/or 618. The physical link may be used as a transport for one or more logical links that support unicast synchronous, asynchronous and isochronous traffic, and/or broadcast traffic. Traffic on logical links may be multiplexed onto the physical link by occupying slots assigned by a scheduling function in a resource manager.

Control information in accordance with control protocols for the baseband and physical layers may be carried over logical links in addition to user data. The control protocols may include a link manager protocol (LMP). Devices 604, 606, 608, 610, 614, 616, and/or 618 that are active in a piconet may be configured for a default asynchronous connection-oriented logical transport that is used to transport the LMP protocol signaling and other logical transports may be created to transport synchronous data streams as needed. A Link Manager function may use LMP to control the operation of devices 604, 606, 608, 610, 614, 616, and/or 618 in the piconet and provide services to manage radio layer and baseband protocol layers.

A Bluetooth device 604, 606, 608, 610, 614, 616, 618 may be said to be connected to a physical channel when synchronized to the timing, frequency and access code of the physical channel, whether or not the Bluetooth device 604, 606, 608, 610, 614, 616, 618 is actively communicating over the channel. Conventionally, a Bluetooth device 604, 606, 608, 610, 614, 616, 618 is capable of connecting to a single physical channel at any time. Bluetooth devices 610, 616 may participate concurrently in two or more piconets 602, 612, and/or 620 using time-division multiplexing. A Bluetooth master device 604, 614 and/or 616 may not serve as a master device on more than one piconet 602, 612, 620 although a Bluetooth device 604, 606, 608, 610, 614, 616, 618 may operate as a slave in multiple independent piconets 602, 612, 620. A Bluetooth device 610, 616 that is a member of two or more piconets 602, 612, and/or 620 may be said to be involved in a scatternet. Conventionally, scatternets do not support network routing. The lack of routing capabilities and limited operational range of Bluetooth transmitters may present an impediment in systems where remote access to Bluetooth devices is desired. For example, it may be desirable to directly control or monitor sensors and other devices from a remote location, including from a mobile communications device that may be located proximate to the Bluetooth devices on some occasions and located remotely from the Bluetooth devices on other occasions.

Wi-Fi may provide wireless connections using radio technologies operating at 2.4 GHz ultra high frequency (UHF) and/or at 5 GHz super-high frequency (SHF). A broad variety of devices may be equipped to support Wi-Fi including, for example, personal computers, gaming consoles, smartphones, digital cameras, tablet computers audio/visual media players, appliances, vending machines, sensors, and so on. Devices may connect to the WLAN through an access point, which may have a range of about 35-75 meters indoors. In some instances, this range may be doubled when the WLAN is deployed outdoors such that line-of-sight obstructions are reduced or eliminated.

The communications range of Wi-Fi technologies may be limited by design or configuration. In some instances, a WLAN network employing Wi-Fi technologies may provide local devices with wireless access to a wide area networking environment, including access to a public network such as the Internet, for example. In other instances, WLAN networks may be range-limited by design or configuration. For example, a WLAN in commercial or residential premises may be deployed without connectivity to external networks such that external devices or systems located outside the premises are prevented from directly and/or indirectly addressing internal devices located within the premises. In this regard, the WLAN has a limited range that may be determined as the transmission range of devices employing Wi-Fi technology to connect to the WLAN.

Power-line communication technologies may be employed to transmit data on a conductor that is also used simultaneously for electric power transmission. Power-line communication may employ Ethernet protocols (Power-line Ethernet), which may have a range that is limited to a single building, portion of a building and/or to a single circuit or phase of the power supply. A modulated carrier signal may be transmitted on the same wire or wires that carry power to a device such as a smart bulb or smart appliance. Devices connected to the power supply may be equipped with filters, modulators, demodulators, encoders and decoders that enable the device to transmit and receive data through its power supply.

Example Of A Protocol Used For Communication Range Extension

According to certain aspects disclosed herein, an intermediate relay node or hub may be deployed to serve as a translator between network technologies, thereby allowing client device to access remote devices that communicate using Bluetooth, NFC or other short-range networking technology. The relay node may be configurable or adaptable for communicating using a wireless technology such as W-CDMA, LTE, WLAN, etc. In many instances, the relay node may connect client devices to remote devices using commonly-supported protocols, including protocols suites based on the transmission control protocol (TCP)/Internet protocol (IP) commonly used for Internet-based communications.

Figure 7:
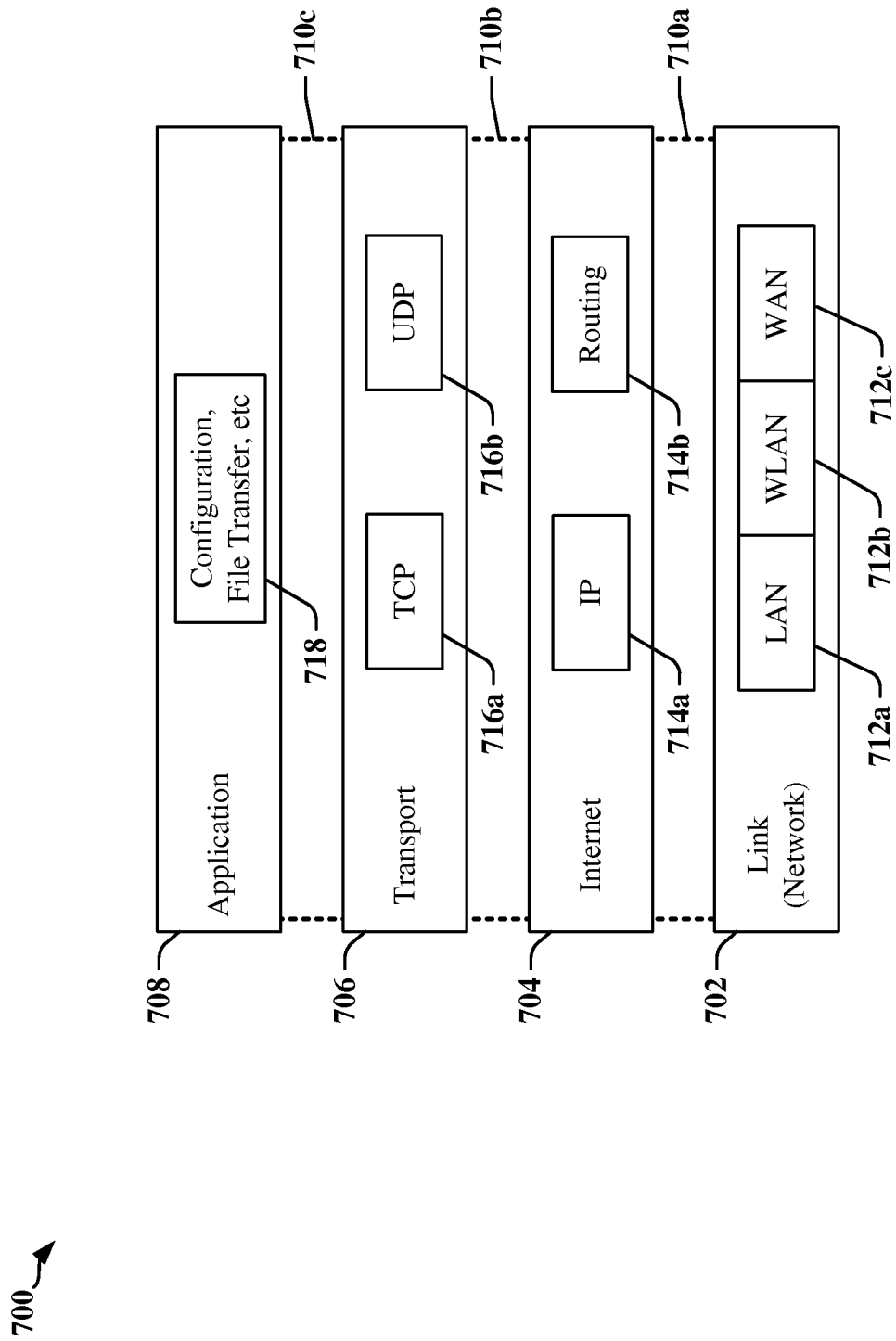
FIG. 7 illustrates a simplified protocol stack.

FIG. 7 is a block diagram simplified showing a simplified protocol stack 700 based on the TCP/IP suite. Four layers 702, 704, 706, and 708 of the protocol stack 700 are depicted, and the interfaces 710a, 710b, and/or 710c between layers 702, 704, 706, and 708 may be defined by standards, including various standards promulgated by the Institute of Electrical and Electronic Engineers.

A Link or Network layer 702 may provide one or more network interfaces 712a, 712b, and 712c that each support a physical transmission medium and corresponding signaling for the medium. In one example, a local area network (LAN) interface may support communications over a wired Ethernet network. In another example, a WLAN interface 712b may provide support for a radio interface used for Wi-Fi communications. In another example, a WAN network interface 712c may provide an interface with a wired network or a wireless network such as a W-CDMA wireless network or an LTE wireless network.

An Internet layer 704 defines addressing 714a and routing 714b procedures used for transmitting packets of data over a TCP/IP based network. The Internet layer 704 provides internetworking between devices on the network. The Internet layer 704 includes an IP protocol 714a that handles addressing of devices using IP addresses, for example. The Internet layer 704 operates to forward packets to a next node along a path to a final destination.

The Transport layer 706 provides one or more services 716a, 716b that manage communications between end devices, regardless of the underlying network technology used to direct and transmit data. In one example, the Transport layer 706 includes a TCP service 716a that provides flow-control, connection establishment, and reliable data transmission. The TCP service 716a may include a variety of protocols, including Hypertext Transfer Protocol (HTTP), Hypertext Transfer Protocol Secure (HTTPS), Simple Mail Transfer Protocol (SMTP), Post Office Protocol (POP), Internet Message Access Protocol (IMAP), Secure Shell (SSH), File Transfer Protocol (FTP), and Telnet. The Transport layer 706 may also include a User Datagram Protocol (UDP) service that provides unreliable data transmission.

The Application layer 708 provides a platform from which higher-level processes and applications can avail of the services provided by the underlying Transport layer 706 and, in some instances, lower layers 702, 704. Data passed from the application layer may be assembled into protocol data units (PDUs) at each layer 702, 704, 706, and/or 708 of the protocol stack. A PDU may be considered to be a unit of data specified by a protocol of a layer 702, 704, 706, 708 in the protocol stack 700 and may include control information and/or user data associated with the layer 702, 704, 706, 708. PDUs may include packets, from a first layer 702, 704, 706, or 708 encapsulated with control and/or addressing information from a second, lower layer 702, 704, 706, or 708.

Systems For Communication Network Range Extension

Figure 8:
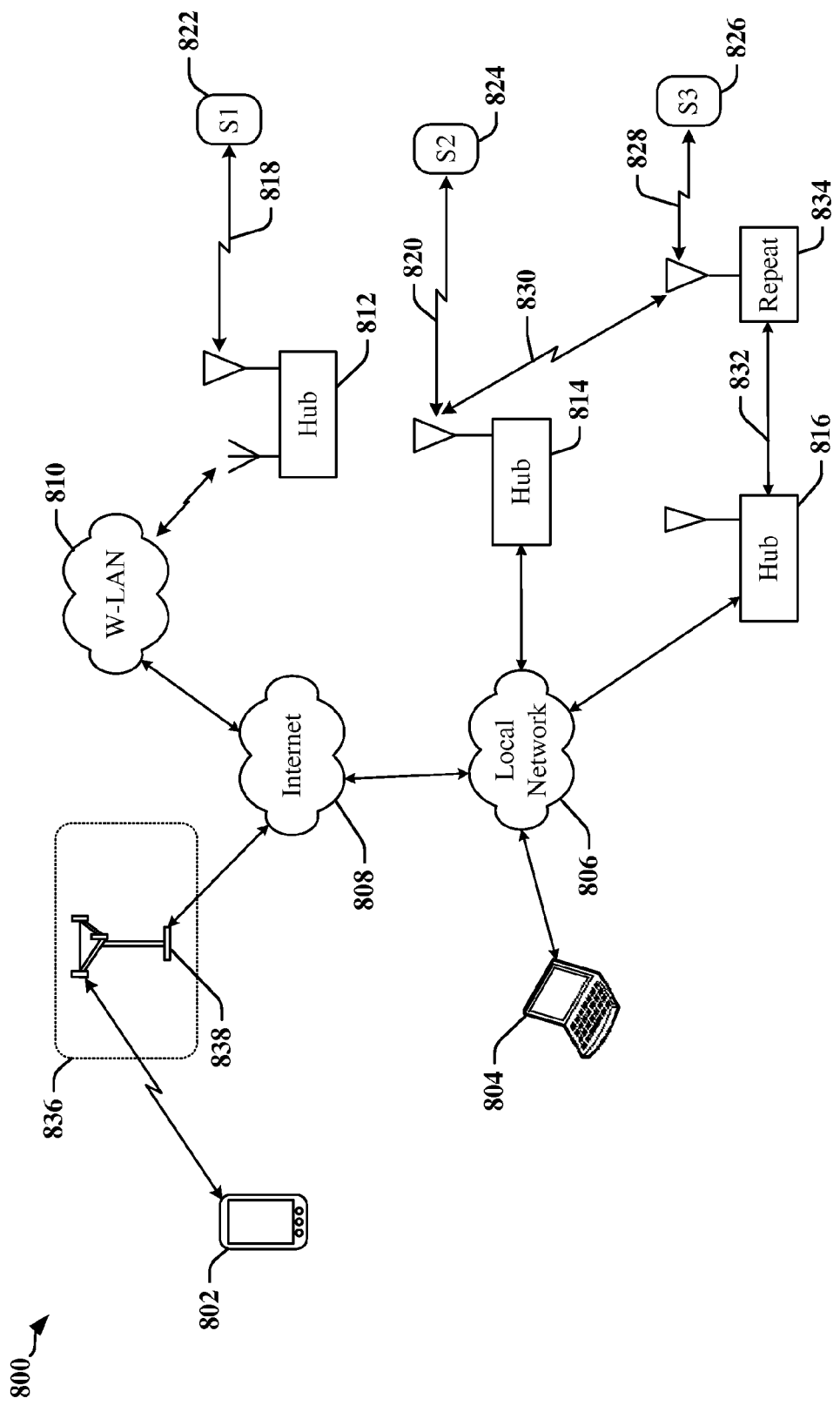
FIG. 8 illustrates a simplified example of communication network range extension according to certain aspects disclosed herein.

FIG. 8 is a schematic drawing illustrating a simplified example of a system 800 for communication network range extension according to certain aspects disclosed herein. In the example, one or more client devices 802, 804 may communicate with one or more remote devices 822, 824, 826 including when the client device 802, 804 is located beyond the range of the communications networks of the remote devices 822, 824, 826. The remote devices 822, 824, 826 may communicate using a range-limited wireless networking technology. In some instances, a range-limited wireless networking technology may be employ a communications technology that has limited physical range such as Bluetooth, NFC technologies or another short-range wireless technology. In other instances, the a range-limited wireless networking technology may employ a networking technology that has wide-area networking capability, but has been deployed in a range-limited network by design and/or by preference. For example, a WLAN employing Wi-Fi may have a radio range measured in hundreds of meters and may be inherently capable of integration in a wide-area network using IEEE 802.11 protocols, but the WLAN may be configured to block direct communication between remote devices 822, 824, 826 and devices that are not directly connected to the WLAN. In at least some instances, the remote devices 822, 824, 826 may be configured to refrain from communicating with, and to reject requests for communications from devices that are not directly connected to the WLAN.

According to certain aspects disclosed herein, the client devices 802, 804 may be provided with indirect access to the remote devices 822, 824, 826 using a hub 812, 814, and/or 816 that is collocated with one or more of the remote devices 822, 824, 826. The hub 812, 814, 816 may be physically located within radio communication range of at least one of the remote devices 822, 824, 826. In some instances, a hub 816 may communicate with a remote device 822, 824, 826 through a repeater 834 that is physically located within radio communication range of the remote device 822, 824, 826. In some instances, a hub 812, 814, 816 may be considered to have direct or indirect access to a remote device 822, 824, 826 when it is capable of establishing communications with the remote device 822, 824, or 826 using the range-limited communication method supported by the a remote device 822, 824, 826.

A hub 812, 814 and/or 816 may be a standalone device that has a first network interface for directly communicating 818, 820, 830 with one or more remote devices 822, 824, 826 using short-range RF communications technology such as Bluetooth or NFC. The hub 822, 824, 826 may have a second network interface that is capable of connecting to a larger networking environment through one or more local area networks 806, 810 and/or a wide area network 808, 836. In some instances, a hub 816 may cooperate with a repeater device 834 that is collocated with a remote device 822, 824, 826 and that communicates with the hub 816 through a wired or wireless connection 832. In one example, a Bluetooth repeater 834 may be configured to communicate through its power supply using Power-line Ethernet 832 to pass messages between the hub 816 and target device 826. In the latter example, the hub 816 need not communicate directly with the target device 826.

According to certain aspects disclosed herein, TCP/IP protocol suites may be adapted to provide a hub 812, 814 that is accessible to a client device 822, 824, 826 using a wide-area networking protocol such as TCP. The remote devices 822, 824, 826 may be accessed by a hub 812, and/or 814 using a short-range networking technology. While the example of TCP/IP is described herein, the hub 812, 814, 816 may connect to any available or suitable local or wide area network using a wired or wireless network interface, and/or the hub 812, 814, 816 may be configured to use a wireless networking technology to avail of packet data services, including Internet-based services. A variety of different types of client device 822, 824, 826 may be used to connect through the hub 812, 814, 816 when the client device 822, 824, 826 supports the same communication protocol as the hub 812, 184. In the example of a TCP based hub 812, 814, 816, the client device 822, 824, and/or 826 may include a desktop computer, a cellular phone, a smart phone, a SIP phone, a laptop, a notebook, a netbook, a smartbook, a PDA, a satellite radio, a GPS device, a multimedia device, a video device, a digital audio player (e.g., MP3 player), a camera, a game console, a wearable computing device (e.g., a smartwatch, a health or fitness tracker, etc.), an appliance, a vending machine, an environmental control system (e.g. a thermostat), an audio or video remote control, a vehicle control system or any other similar functioning device.

A client device 802, 804 may communicate with a remote device 822, 824, or 826 when out of range by transmitting a message over one or more networks 806, 808, 810, 836 to a hub 812 or 814. The hub 812, 814, 816 may receive and decode the message in order to determine a remote device 822, 824, 826 to which the message is directed. In one example, the message may include one or more packets for transmission to the targeted remote device 822 or 824 using a short-range wireless technology. The hub 812, 814, 816 may establish a connection with the targeted remote device 822, 824, 826 using information maintained by the hub 812 or 814 regarding previously registered remote devices 822, 824, 826.

The hub 812, 814, 816 may be configured or adapted to communicate over a network that operates in accordance with certain layers 702, 704, 706, and/or 708 of a protocol suite 700 based on TCP/IP (see FIG. 7). The hub 812, 814, 816 may provide TCP services 716a as defined by the Transport layer 706, and one or more lower layers 702, 704 may be adapted for the networking technology employed in a wide area network. The combination and configuration of the protocols used by the client devices 822, 824, 826 and the hubs 812, 814, 816 may be selected according to the network configuration employed to transport data between the client devices 802, 804 and the hubs 812, 814, 816.

A first client device 802 may be configured for wireless communication over a RAN 836 using LTE, W-CDMA, or other wireless networking technology. The first client device 802 may be associated with a base station 838 and core network that provides packet data services enabling the client device 802 to communicate over the Internet 808. Each of the hubs 812, 814, 816 may communicate over the Internet 808 through a local network 806 or 810. In one example, the local network 806 may provide a wired connection for one or more of the hubs 812, 814. In another example, a WLAN 810 may provide a wireless connection for one or more of the hubs 812, 814, 816. The hubs 812, 814, 816 may establish a TCP/IP communications session on a local network 806 or 810 such that data can be routed between the hubs 812, 814, 816 and the first client device 802 through the Internet 808 or another wide area network. For example, data may be routed between the first hub 812 and the first client device 802 through one or more wireless networks 836.

A second client device 804 may be configured for wired or wireless communication through a local network 806 or 810. Each of the hubs 812, 814, 816 may communicate over the Internet 808 through a local network 806 or 810. In one example, the local network 806 may provide a wired connection for a second hub 814 and the second client device 804 such that communication between the second hub 814 and the second client device 804 can remain within a private local network 806. In another example, a WLAN 810 or other local network may connect the first hub 812 to the Internet 808. The first hub 812 may establish a TCP/IP communications session on a local network 810 such that data can be routed between the first hub 812 and the second client device 806 through the Internet 808 or another wide area network.

Figure 9:
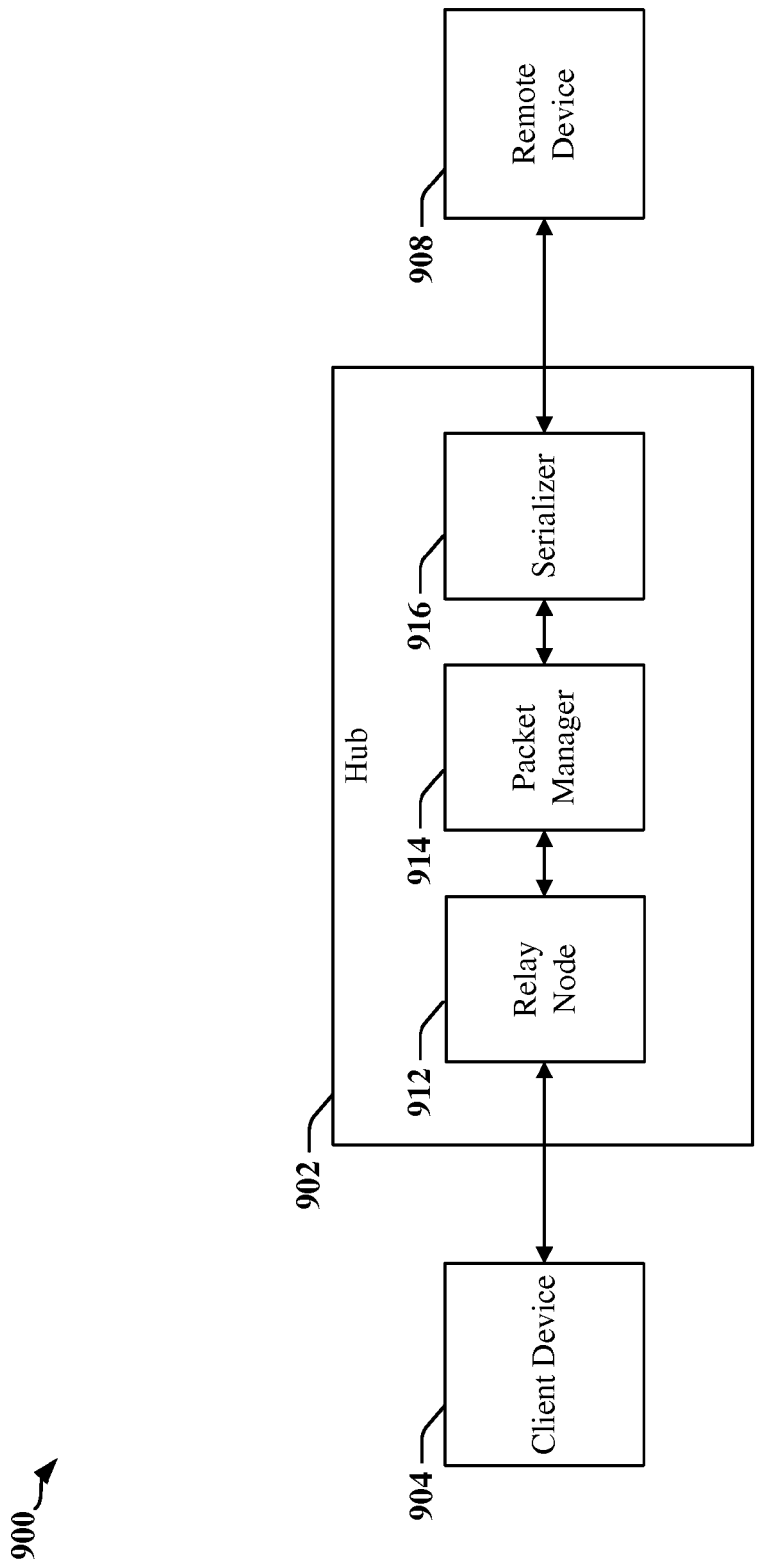
FIG. 9 illustrates a first example of a hub used for communication network range extension according to certain aspects disclosed herein.

FIG. 9 is a block diagram illustrating certain aspects of a hub 902 used in a system 900 for communication network range extension. The illustrated system includes a hub 902 that may be configured to provide a client device 904 with access to a remote device 908, where the remote device 908 communicates using a short-range wireless technology. The system 900 may be used to facilitate networked communications with one or more client devices 904. While a single client device 904 is illustrated in FIG. 9, any number of client devices 904 may be included. Similarly, while a single remote device 908 is shown in FIG. 9, any number of remote devices 908 may be included. The client device 904 and/or the remote device 908 may include any type of device. For example, the client device 904 may be one of the client devices 802, 804 discussed in relation to FIG. 8, and the client device 904 may be implemented in one a variety of different types of computing devices having a processing circuit 100 (see FIG. 1).

In some instances, the remote device 908 may be physically located remotely from the client device 904, such that short-range communications utilized by the remote device 908 may preclude direct communication between the remote device 908 and the client device 904.

In accordance with certain aspects of the disclosure, the hub 902 may perform a variety of functions, including buffering, scheduling, data translation, routing and gateway functions. The hub 902 may include the processing circuit 100 illustrated in FIG. 1. The hub 902 may be used to provide a communications interface between the client device 904 and the remote device 908. In on example, the client device 904 may interface with the hub 902 using a long-range communication technology, and the remote device 908 may interface with the hub 902 using a short-range communication technology. In this respect, the hub 902 may be located within the communication range of the remote device 908. In some instances, the hub 902 may communicate with the remote device 908 using a repeater (not shown) configured to support the short-range communications utilized by the remote device 908.

The hub 902 may facilitate or enable unidirectional or bidirectional communication between the client device 904 and the remote device 908. The hub 902 may also serve as a translator between two network technologies, including between short-range communication and long-range communication technologies.

The hub 902 may include one or more devices or components. In the illustrated system 900, the hub 902 is shown as including a relay node or relay 912, a packet manager 914, and a serializer 916.

The hub 902 may include a relay node 912 that is configured to receive requests and/or messages from one or more client devices 904 using a wide area (long-range) communication network. The relay node 912 may be configured to manage communications with multiple client devices and to track and organize arriving messages in accordance with message source and time-of-arrival at the relay node 912. The relay node 912 may be configured to receive and buffer messages from one or more client devices 904 and to sort and/or buffer messages in accordance with the source and/or destination of the messages. In one example, a source buffer or queue may be provided for each source client device 904. Messages from a client device 904 may be directed to the corresponding source buffer or queue.

In another example, a destination buffer or queue may be provided for each destination or target remote device 908 and messages directed to a remote device 908 may be directed to the corresponding destination buffer or queue. In another example, messages may be stored in a sequential buffer or queue together with source and destination information in a sequence corresponding to time of arrival at the hub 902. A combination of source, destination and sequential buffers or queues may be employed as desired. In some instances, a source buffer for incoming messages from the client device 904 may be provided in the relay node 912 with a destination buffer for messages received from a remote device 908, while a packet manager 914 or serializer 916 may maintain a source buffer for incoming messages from the remote device 908 and a destination buffer for messages originating from the client device 904.

The messages received by the relay node 912 may be carried in one or more packets. The relay node 912 may assemble a message from the packets before forwarding the message through the hub 902. Information identifying the source and destination of each message and/or packet in addition to sequence numbers of the packets may be carried in headers of one or more packets associated with the received messages.

The hub 902 may include a packet manager 914 that is adapted or configured to translate incoming packets from a first format to a second format. The first format packets may be received from the client device 904 and the second format packets may be forwarded for transmission to the remote device 908 in a format consistent with the protocols governing transmission data and control over a short-range communications network employed by the remote device 908. In one example, the packet manager 914 may reformat TCP packets received by the relay node 912 from the client device 904 to a format suitable for a short-range communication technology such as Bluetooth or NFC technologies.

The packet manager 914 may also translate and/or reformat packets received from the remote device 908 into a format suitable for transmission over a local network and/or wide area network to the client device 904. In various implementations translation and/or reformatting may involve packets produced at different layers of a protocol stack. For example, translation and/or reformatting may be performed at the TCP layer or the IP layer. In some instances, Network or Physical layer translation or reformatting may be performed.

Short-range, and/or low-energy network technology employed by the remote device 908 may impose more stringent specifications for protocol data units (PDUs) associated with short-range network protocols than on the PDUs associated with networking protocols used by the client device 904. Differences in PDU specifications may result in shorter packet sizes carrying lower payload data (i.e. user data), and a reduced set of control information, such as limited or eliminated error correction. Accordingly, the packet manager 914 may extract data and control information by disassembling packets generated by a layer of the protocol stack associated with the client device 904 and reassemble data and control information into packets of a format appropriate for the short-range network technology. Reassembly of the data and control information may include address translation, translation of control information, removal of padding from data payloads, and packet size realignment. Reassembly of the data and control information may include generating additional information (metadata) to manage the transmission of individual packets or sequences of packets to the remote device 908. The additional information may include source addresses, routing information, message priorities, error correction codes, etc.

The hub 902 may include a serializer 916 that is configured to manage the transmission of data and control to each remote device 908 associated with the hub 902. The serializer 916 may be adapted to receive packets from the packet manager 914 in a format consistent with the short-range network protocols used by the remote device 908 that is a target of the transmission. For example, the packet manager 916 may receive TCP packets from the relay node 912 and may produce a set of Bluetooth data packets for transmission to a remote Bluetooth device 908. The serializer 916 may track and queue the translated packets, and may cause the translated packets to be transmitted to the remote Bluetooth device 908. The serializer 916 may be configured or adapted to manage communications between multiple clients 904 and multiple remote devices 908. In this regard, the serializer 916 may manage transmission of the translated packets to a remote device 908, receive a response, including acknowledgements, from the remote device 908 and provide the result to the packet manager 914 for reformatting and transmission to the appropriate client device 904 as needed. The serializer 916 may be configured to control and/or manage timing, transmission, and reception of packets to and from the remote device 908.

Configurations Of Communication Network Range Extension Devices

Figure 10:
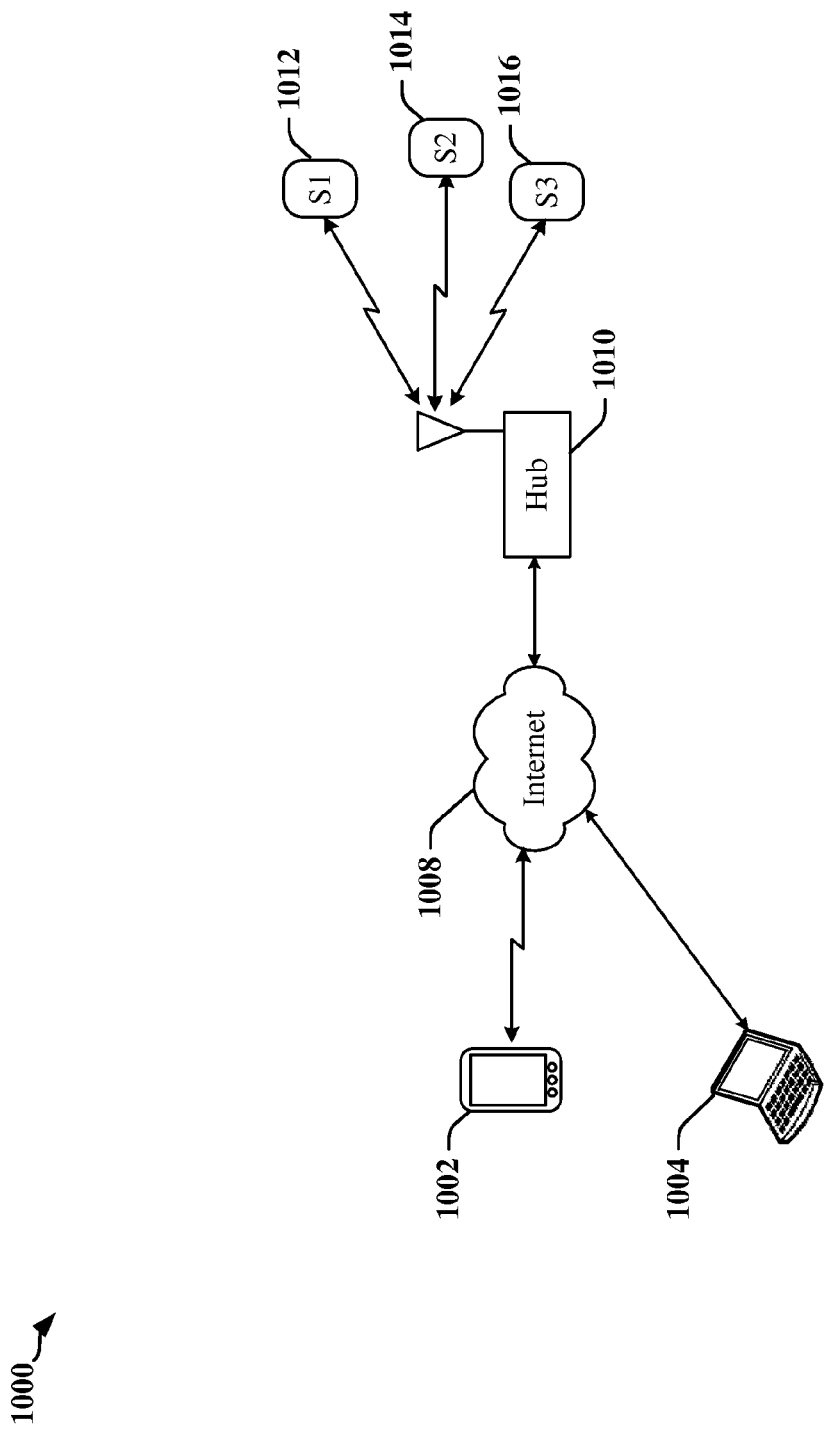
FIG. 10 illustrates a system in which multiple remotely controlled devices are coupled to multiple client devices through a communication network range extension hub.

FIG. 10 illustrates a general example of a system 1000 in which multiple remote or remotely controlled devices 1012, 1014, 1016 are coupled to multiple client devices 1002, 1004 through a hub 1010. The hub 1010 may be configured to support a TCP/IP based interface with the client devices 1002, 1004 and may communicate with the client devices 1002, 1004 through the Internet 1008. The hub 1010 may communicate with the remotely controlled devices 1012, 1014, 1016 using a short-range communication technology such as Bluetooth or NFC, for example. In one example the remotely controlled devices 1012, 1014, 1016 may include one or more smart light bulbs. In another example, the remotely controlled devices 1012, 1014, 1016 may include a smart door lock. The hub enables the remotely controlled devices 1012, 1014, 1016 to be controlled from a device is that is located beyond the range of the short-range communication technology. In the example of smart light bulbs, the devices 1012, 1014, 1016 may conventionally be controlled using a remote control device having limited range, and the hub 1010 may permit a remotely located computing device 1004 or mobile communications device 1002 to control the light bulbs 1012, 1014, 1016. According to certain aspects disclosed herein, the light bulbs 1012, 1014, 1016 may be individually controlled, or some or all of the light bulbs 1012, 1014, 1016 may be controlled as a group.

The hub 1010 may support communications between one or more client devices 1002, 1004 and one or more remote devices 1012, 1014, 1016. In one example, a single client device 1002 or 1004 may control and/or communicate with one or more remote devices 1012, 1014, 1016. In another example, a single remote device 1012, 1014, 1016 may communicate with and be controlled by multiple client devices 1002 and 1004. The hub 1010 may be adapted or configured to manage access between multiple client devices 1002, 1004 and multiple remote devices 1012, 1014, and/or 1016.

The hub 1010 may support unidirectional and/or bidirectional communications between one or more client devices 1002, 1004 and one or more remote devices 1012, 1014, 1016. Unidirectional communications may be supported in either direction. A client device 1002, 1004 may send command and control messages to the remotely controlled devices 1012, 1014, 1016 without expectation of a response from the remotely controlled devices 1012, 1014, 1016. In one example, response may not be expected from devices 1012, 1014, 1016 that include light bulbs, switches and other such devices. A remote device 1012, 1014, or 1016 that includes a sensor may transmit messages and alerts arbitrarily or in accordance with a predefined schedule.

The hub 1010 may support a synchronous messaging scheme that enables one or more remote devices 1012, 1014, 1016 to respond to commands or requests from a client device 1002, 1004. In one example, the hub 1010 may determine that an incoming message corresponds to an active HTTPS connection with a client device 1002, 1004 and may forward the message to the client device 1002, 1004. In some instances, the hub 1010 may store the message for later transmission, in response to a poll for example. The hub 1010 may receive the response message from the remote device 1012, 1014, 1016 in a first format (e.g., Bluetooth), and may translate the response message to HTTPS format. The hub 1010 may log information regarding the state of the sending remote device 1012, 1014, 1016. In some instances, the hub 1010 may insert additional information into the HTTPS version of a message to be transmitted to the client device 1002, 1004. For example, the hub 1010 may add information identifying the type, location and current state of the sending remote device 1012, 1014, 1016.

The hub 1010 may support an asynchronous messaging scheme that enables one or more remote devices 1012, 1014, 1016 to transmit messages to a client device 1002, 1004 or to one or more other remote devices 1012, 1014, 1016. In asynchronous mode, the hub 1010 may receive messages from the remote device 1012, 1014, 1016 that are not directly responsive to a request or command transmitted by the client device 1002, 1004. In asynchronous mode, the hub 1010 may receive messages from the remote device 1012, 1014, 1016 when there is no session or connection associated or established with the remote device 1012, 1014, 1016.

In response to an asynchronous message a hub 1010 may store the content of the asynchronous message in nonvolatile storage, translate the asynchronous message, retransmit the asynchronous message, and/or generate a new message for transmission to the client device 1002, 1004 and/or to one or more other remote devices 1012, 1014, 1016. The asynchronous message may be stored such that it can be retrieved and transmitted to a client device 1002, 1004 in response to a request or command. The asynchronous message may be translated from a first message format (e.g. Bluetooth or NFC) to a second message format that can be transmitted over a wide area network. In one example, the asynchronous message may include an alert from a sensor or security device and the message or a translated version of the message may be translated from a Bluetooth format to a notification that can be pushed to one or more to the client devices 1002, 1004.

The hub 1010 may respond to first message received from a first remote device 1012, 1014, 1016 by transmitting a second message to one or more other remote devices 1012, 1014, and/or 1016. The second message may include some or all of the content of the first message, new content generated by the hub 1010, or some combination of the content of the first message and new content. The second message may be sent to a group of remote devices 1012, 1014, 1016 that are of the same type, perform similar functions or have some other common characteristic or cause for grouping. In one example, a first remote device 1012, 1014 or 1016 may be a sensor or smart light bulb that asynchronously transits the first message as a trigger to activate or deactivate light bulbs in an automatic lighting system. For example, the first message may include information identifying a current ambient light level, a threshold crossing of an ambient light level, motion detection, a manual override, etc. The hub 1010 may rebroadcast the first message to other light bulbs that are elements of the automatic lighting system. In this manner, a message transmitted by a sensor may be broadcast across a large area regardless of the radio communication range of the sensor and/or the individual remote devices 1012, 1014, 1016 in the automatic lighting system. The hub 1010 may be configured to prevent an endless loop of messages by maintaining and using information that may identify and track messages that are rebroadcast by the hub 1010 and other hubs. For example, the hub 1010 may maintain information related to address information identifying the remote devices 1012, 1014, 1016 that sent the first message, information identifying one or more retransmitting hubs, and/or information identifying the age of the content of such messages. Identifying information may be appended to content of the second message that is transmitted by the hub 1010.

In FIG. 10, the remote devices 1012, 1014, 1016 may include at least some devices that are the same make or model and/or that perform the same or similar functions. In one example, the remote devices 1012, 1014, and/or 1016 may include door locks that are locked and/or unlocked when an NFC device proximately located to a lock provides authentication matching a lock to be opened. The latter example may apply to a system for providing access to a home, to a hotel room, an office building, an automobile, etc. In this example, a hub 1010 may support a large number of remote devices 1012, 1014, 1016, with multiple client devices 1002, 1004 authorized to access each remote device 1012, 1014, 1016, and the hub 1010 may be adapted or configured to manage addressing and timely delivery of messages transmitted by multiple client devices 1002, 1004 to a single remote device 1012, 1014, or 1016. For example, two devices may send conflicting commands to a smart door lock or a smart light bulb. The conflicting commands may include lock and unlock commands sent at approximately the same time to a smart door lock, or ON, OFF, change color and/or DIM commands sent to a smart light bulb at approximately the same time. The hub 1012 may schedule or sequence transmission of the different commands such that, for example, multi-packet messages from different client devices 1002, 1004 are not interleaved, since interleaved messages can result in incomprehensible or conflicting control, commands or data being sent to a targeted remote device 1012, 1014, 1016.

Figure 11:
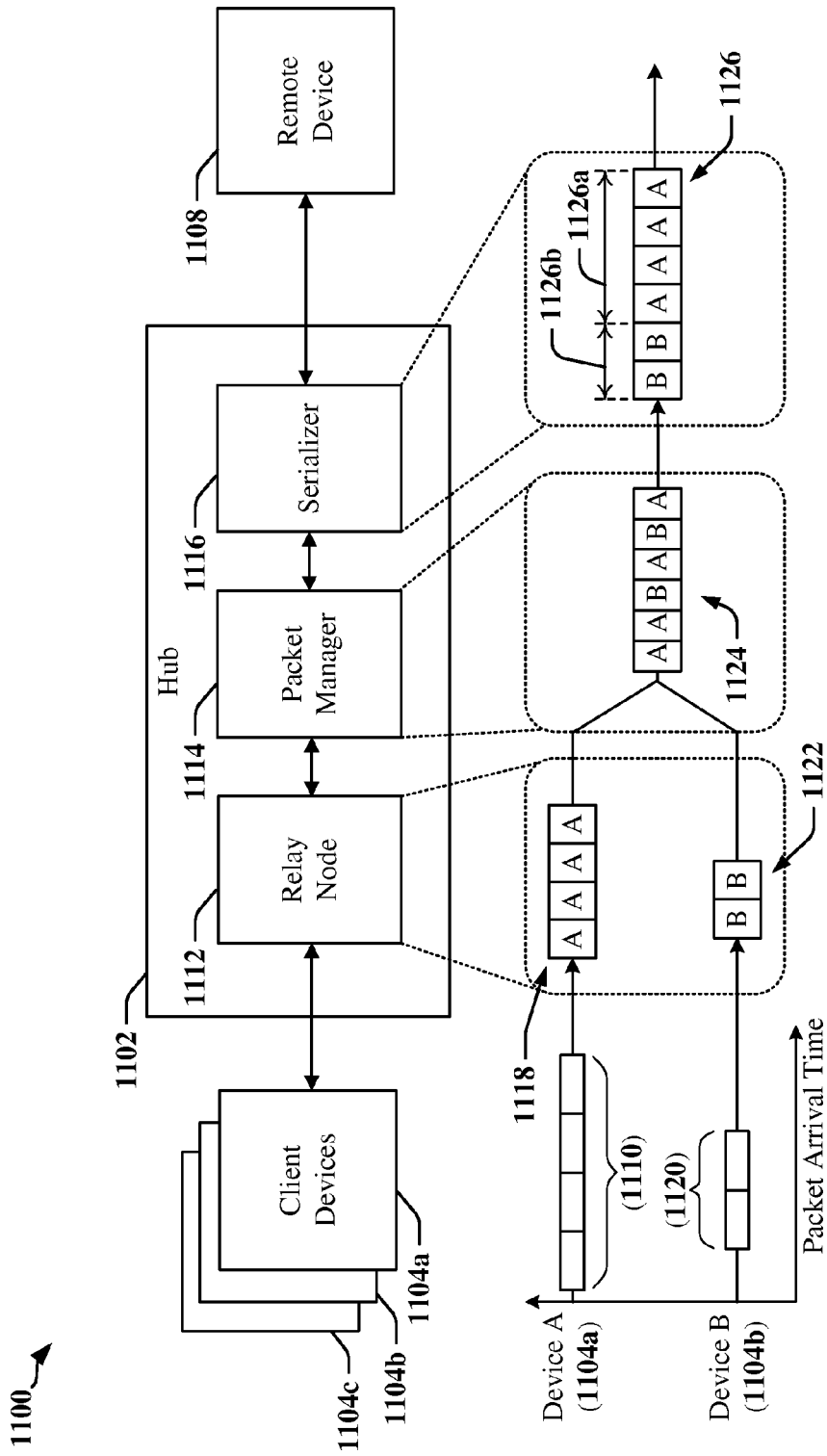
FIG. 11 illustrates data flow through a hub used for communication network range extension.

FIG. 11 is a diagram 1100 illustrating certain aspects of data flow through a hub 1102 that supports multiple client devices 1104a, 1104b, 1104c and a single remotely controlled device 1108. In the example, two clients 1104a, 1104b may simultaneously attempt to access, or communicate with, the same remote device 1108. For example, a first client device 1104a may transmit a set of 4 packets 1110 at substantially the same time that a second client device 1104b transmits a set of 2 packets 1120. There may be a full or partial overlap in timing of the arrival of the packets 1110 carrying a message from the first client device 1104a and the arrival of the packets 1120 carrying a message from the second client device 1104b.

The relay node 1112 may receive and process the sets of packets 1110 and 1120 to identify a target remote device 1108 for the packets 1110 and 1120. The relay node 1112 may then pass identified packets 1118 and 1122 to the packet manager 1114 with information that may include information identifying source and destination of the packets 1110 or 1120, other routing information associated with the packets 1110 and/or 1120, and time of arrival of each packet in the sets of packets 1110, 1120. The packet manager 1114 may disassemble packets 1118, 1122 received from the relay node in accordance with a protocol used by the client devices 1104a, 1104b to transmit the packets, and may then generate packets appropriate for the communications protocols used by the remote device 1108. In one example, the packet manager 1114 may disassemble TCP packets 1118 and/or 1122 corresponding to one or more of the client devices 1104a and/or 1104b, and may then generate Bluetooth data packets 1124 for transmission to the remote device 1108. In some instances, the Bluetooth packets 1124 may be provided to the serializer in a single stream, queue or buffer (as depicted) in an order based on time of arrival at the hub 1102, and the combined packets 1124 may be transmitted with source, destination and other information characterizing the message to be sent to the remote device 1108. In some instances, packets 1122 and 1118 may be translated by the packet manager 1114 to PDUs for transmission to the remote device 1108, where PDUs carrying messages from different client devices 1104a, 1104b are provided to the serializer 1116 in different streams, queues or buffers.

The serializer 1116 may adapted or configured to separate PDUs, including Bluetooth data packets for example, into a set of PDUs or packets 1126 that includes sub-sequences of PDUs or packets 1126a, 1126b separated according to source remote device 1104a, 1104b. The serializer 1116 may reorder the PDUs or packets 1124 into an ordered sequence of packets 1126 based on time of arrival of the first or last packet in each sub-sequence of PDUs or packets 1126a, 1126b, priorities assigned to the messages contained in the sub-sequences of PDUs or packets 1126a, 1126b, priorities assigned to the client devices 1104a, 1104b, or based on some other predefined ordering parameter. In some instances, the ordering of the sequence of packets 1126 may be arbitrarily determined, including when no other prioritization method yields a usable result. In operation, the serializer 1116 may ensure that packets 1110, 1120 received from each of the client device 1104a, 1104b, 1104c are forwarded in the proper order after processing, and that a complete message is transmitted to the remote device 1108 in its entirety before transmission of another message commences. Accordingly, the serializer 1116 may prevent interleaving of packets 1126a, 1126b from different client devices 1104a, 1104b.

Figure 12:
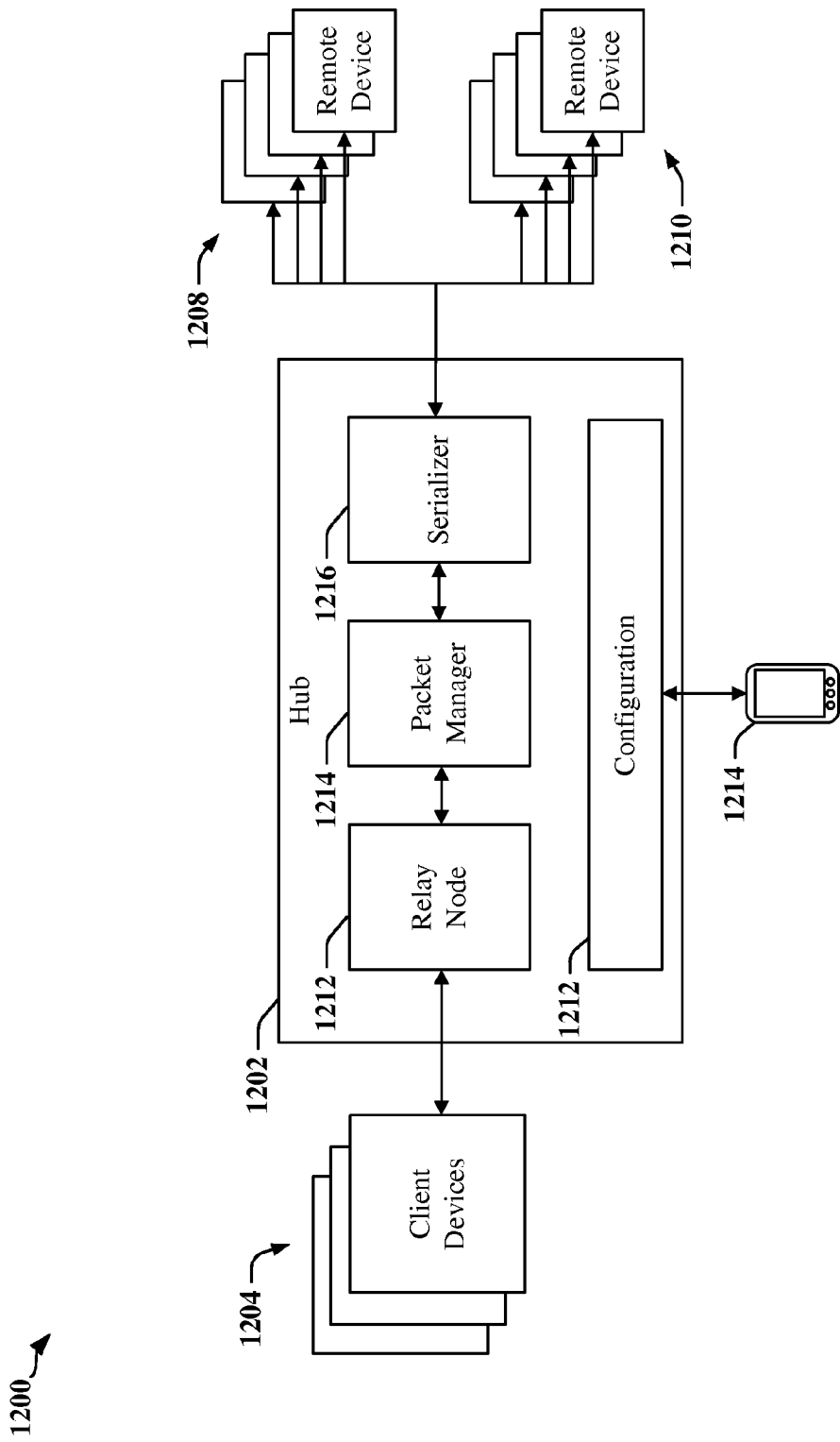
FIG. 12 illustrates a second example of a hub used for communication network range extension according to certain aspects disclosed herein.

With reference to FIG. 12, a hub 1202 may support communications between one or more client devices 1204 and one or more groups of remote devices 1208, 1210. In one example, a single client device 1204 may control and/or communicate with different types of remote devices 1208 or 1210. For example, one group of remote devices 1208 or 1210 may include lighting fixtures in a residence that have smart bulbs, while another group of remote devices 1210 or 1208 may include heating, ventilation and air conditioning (HVAC) controllers, while other remote devices (not shown) communicate individually with the or more client devices 1204. The hub 1202 may be adapted or configured to maintain information identifying membership of groups of remote devices 1208, 1210, identify messages directed to groups of remote devices 1208, 1210, and forward such messages to all members of the identified groups of remote devices 1208, 1210.

A group of remote devices 1208, 1210 may be defined in configuration information 1212 maintained at the hub. The configuration information 1212 may be predefined during manufacture and/or installation of the hub 1202. The configuration information 1212 may be provided or modified by a configuring device 1214 that may be physically connected for the purposes of configuration, or that may be wirelessly connected, or that may reside on a network and communicate with the hub 1202 using one of the communication interfaces provided in the hub 1202.

In some instances, groups of remote devices 1208, 1210 may be automatically generated or updated when a remote device connects to the hub 1202 and provides identifying information. The identifying information may include a device profile that includes information related to the type and capabilities of the device. For example, a device may provide a device profile indicating a smart light bulb and the device may be added as a member of of group of similar devices 1208 or 1210.

It will be appreciated that the hub 1202 may support large groups of remote devices 1208, 1210, particularly when repeaters are used to increase the geographical range of the short-range communications capabilities of the hub 1202. Accordingly, the configuration information may be used to provision the resources assigned to the relay node 1212, the packet manager 1214, and the serializer 1216. In some instances, the number of devices supported by the hub 1202 may be increased when grouping is used because fewer individual queues and/or buffers may used when a message is transmitted multiple times, than when the same message is transmitted to each of a large number of similar devices.

According to certain aspects, the hub 1202 may maintain, or have access to, a profile associated with each remote device 1208, 1210. For example, a configuration module or circuit 1212 may include storage organized as a database that maintains a profile for each remote device 1208, 1210. Each profile may be at least initially populated in the database based on an advertisement or advertisement message transmitted by remote devices 1208, 1210. The advertisement or advertisement message may be provided to, or received by, the hub 1202 as part of a registration procedure. For example, a remote device may register with the hub 1202 in order to enroll in a communication service provided by the hub 1202 or an affiliated service provider. Table 1 provides a simplified example illustrating profile information that may be advertised by a device and/or classified or maintained by the hub 1202.

TABLE 1

| Device ID | RAT | Device Type | Capabilities |
|---|---|---|---|
| 1 | BLE | Smartphone | Phone calls |
| 2 | NFC | Television | Streaming audio/video |
| 3 | BLE, NFC | Security | Audio alarms, Lock, Unlock |
| 4 | NFC | Light Bulb | On/Off, Strobe |
| 5 | NFC | Light Bulb | On/Off |

Each row of Table 1 may include a profile corresponding to a remote device. An ID field may include information providing an address at which the corresponding device can be reached using on of the radio access technologies (RATs) supported by the device. The Device ID may be a simple numeric index or may be a valid network address, or both. The Device ID may include an identifier of a group of remote devices 1208, 1210. The Device ID may be used by the hub 1202 to selectively route or transmit messages to a particular remote device, group of remote devices 1208, 1210 or subset of a group of remote devices 1208, 1210 remote devices 308. In some instances, the hub 1202 may broadcast a message with an identifier field included in the message such that a remote device, or group of remote devices 1208, 1210 can determine whether the message is relevant, or should be received and/or processed. The device profile may include other information such as an identification of a type of device and capabilities of the corresponding remote device.

When more than one RAT is available to be used for communications with one of the remote devices 1208, 1210, a RAT may be selected by the hub 320 based on one or more factors or conditions, including a determination of which RAT or RATs is currently in use by the target remote device 1208, 1209. Other factors may include load balancing, power consumption, communication complexity, etc.

A device profile may include any number of fields, and the hub 1202 may add management fields that can be used, for example, to manage group memberships, track communications between remotely controlled devices and client devices exercising control, and/or to maintain histories of interactions, status of communications links, error logs, and so on.

According to certain aspects, a message transmitted by a client device 1204 may be translated, reformatted and/or scheduled by the hub 1202 for transmission to a group of remotely controlled devices 1208, 1210. The message transmitted by the client device 1204 may include data and control information. The message may be interpreted by each device in the group of devices 1208, 1210 as a command to perform a function. For example, the client device 1204 may transmit a message that causes a group of light bulbs 1208, 1210 in a residence or business to turn on, turn off, set a dimming level, change color, initiate a strobe effect, and/or perform another function within the capabilities of the individual light bulbs in the group of remote devices 1208, 1210.

In some instances, a group of remote devices 1208, 1210 may be operated according to a schedule that includes repetitive events and actions. For example, light bulbs in a business may be turned on and off at different times of the day. Different groups of light bulbs may be operated according to different schedules. For example, a first group of light bulbs may be designated as emergency lighting to be always turned on, a second group of light bulbs may be designated to provide daytime lighting, and a third group may be designated to provide early evening lighting. Light bulbs may be assigned to one or more groups and, in operation, different commands may be sent to the different groups to control the lighting environment of a building.

According to certain aspects, the hub 1202 may be configured to process, translate and/or relay messages received from a client device 1204. The client device 1204 may send a message to the hub 1202, where the message targets a group of devices 1208, 1210, a class of device (e.g. security, lighting, audiovisual and other classes), and/or a type of device (e.g. types of sensor, light bulb, audiovisual device, etc.). The client device 1204 may be unaware of the number of devices to which the message may apply. For example, the client device 1204 may transmit a message to the hub 1202 that includes a command to "turn off all lights." In one example, the message may be transmitted by the client device 1204, or an intermediary, in HTTPS format, and the hub 1202 may translate the HTTPS message into a format suitable for transmission to devices in one or more groups of devices 1208, 1210 using protocols and signaling compliant or compatible with Bluetooth, NFC, Wi-Fi, Power-line Ethernet, or another range-limited communications technology. In the example, the message may be transmitted to a number of light bulbs connected to the hub using the appropriate range-limited radio communications technology.

In operation, the hub 1202 may receive a message from a client device 1204 directed to a group of remote devices 1208, 1210. The hub 1202 may then send the message individually to each member of the targeted group of remote devices 1208, 1210. In some instances, the group of remote devices 1208, 1210 may be capable of responding to a broadcast message, whereby addressing information common to each device in the group of remote devices 1208, 1210 is used to cause each device to receive and handle the message. In one example, the relay node 1212 of the hub 1202 may determine that a message is directed to group of devices, and may provide the packet manager 1214 with a copy of the packets carrying the message for each member of the targeted group of remote devices 1208, 1210. A more resource-efficient approach may be adopted, in which the message is translated by the packet manager into one or more PDU formats associated with the targeted group of remote devices 1208, 1210, such that the serializer 1216 may generate and queue a copy of the message in appropriate packet format for each type of device in the targeted group of remote devices 1208, 1210.

In some instances, the hub 1202 may respond to commands or messages from the client device 1204 by transmitting a sequence of one or more predefined commands to the devices in the group of remote devices 1208, 1210. The hub 320 may determine that a message received from the client device may specify a general command that involves different actions taken by different devices in a targeted group of remote devices 1208, 1210. For example, a "Lock Premises" command (or the like) may be directed a set of different types of devices in a "Security" group of remote devices 1208, 1210. The Security group of remote devices 1208, 1210 may include an alarm system controller, door locks, light bulbs and audio/visual monitoring equipment, and each type of device may have different capabilities and be in different states of operation from one another. For example, at least some light bulbs may be turned off when the alarm system controller, door locks, and audio/visual monitoring equipment are turned on after the premises are locked. Accordingly, the hub 1202 may translate the "Lock Premises" message by generating a "Lights Off" command to be transmitted to a sub-group of the group of remote devices 1208, 1210 that includes the light bulbs that should be turned off, 'System Activate" commands to be sent to sub-groups of the group of remote devices 1208, 1210 that includes alarm system controllers and/or audio/visual equipment, a "Lock" command to be sent to a sub-group of the group of remote devices 1208, 1210 that includes the door locks. In one example, this command translation function may be performed by the packet manager 1214 and/or by another module or circuit that is configured to analyze the content of the message received from the client device 1204. In another example, a command translation function may be effected by a lookup using a received command for a target group of remote devices 1208, 1210 as an index to retrieve a set of commands to be sent to the target group of remote devices 1208, 1210 and addresses of the devices intended to receive each command in the set of commands.

Figure 13:
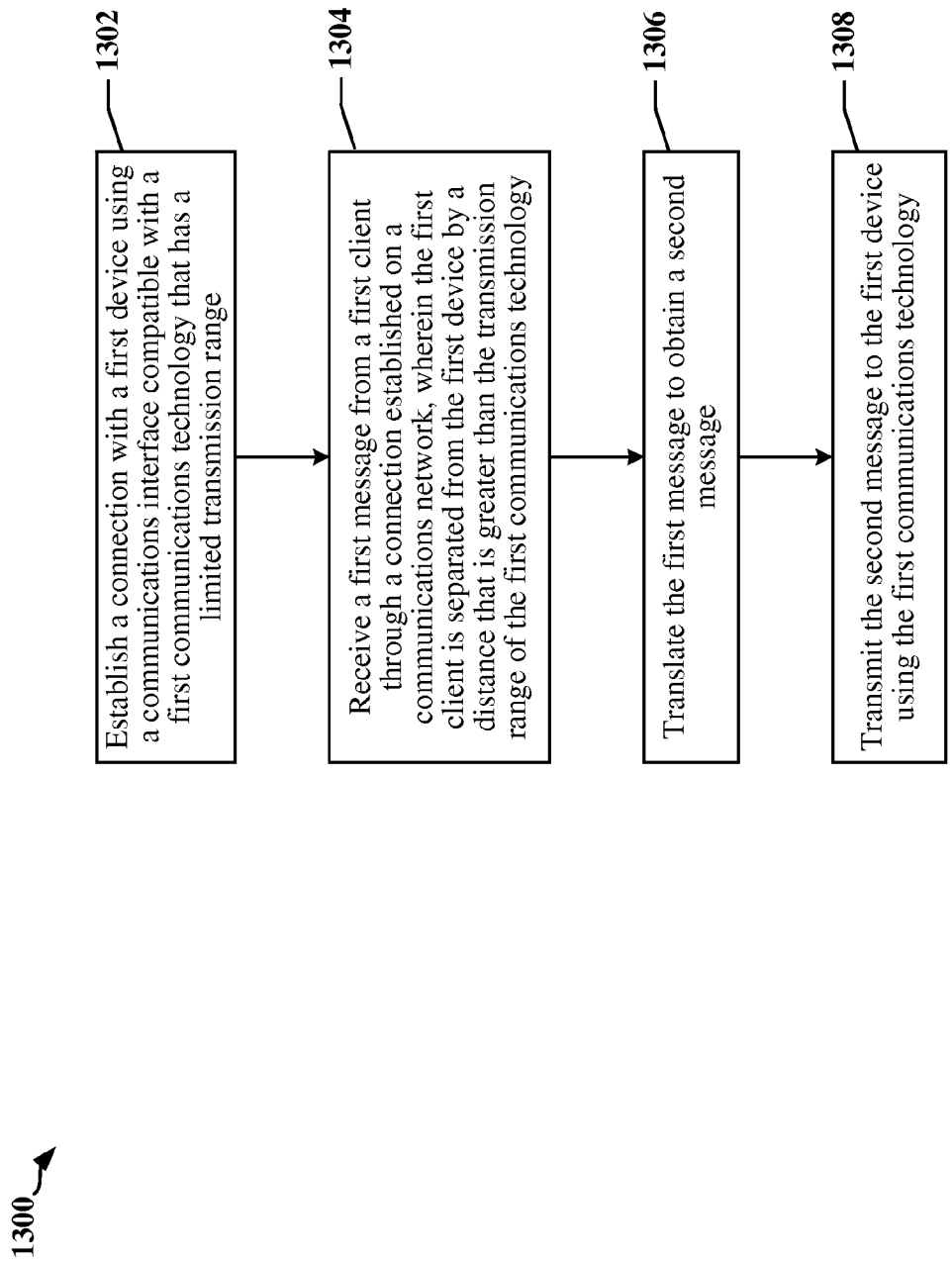
FIG. 13 is a flow chart illustrating an example of radio-agnostic message translation according to certain aspects disclosed herein.

FIG. 13 is a flow chart illustrating method of wireless communication 1300 according to certain aspects disclosed herein. The method may be performed by a processing circuit of a device adapted to function as a hub 902 (see FIG. 9). At block 1302, the hub 902 may establish a connection with a first device that communicates using a first networking technology that has a limited transmission range.

At block 1304, the hub 902 may receive a first message from a first client through a connection established on a communications network. The first client may be separated from the first device by a distance that is greater than the transmission range of the first networking technology.

At block 1306, the hub 902 may translate the first message to obtain a second message. Addressing information of the first device may be concealed from the first client.

At block 1308, the hub 902 may transmit the second message to the first device using the first networking technology.

In one aspect, the first message is directed to a group of devices. In one example, the first networking technology may be used to transmit the second message to a plurality of devices in the group of devices. In another example, the group of devices includes a second device that communicates using a second networking technology, which has a limited transmission range and the first device. The second networking technology may be used to transmit the second message to a plurality of devices corresponding to the class of devices.

In one aspect, a third message may be received from a second client through a wide area network. The second client may be separated from the first device by a distance that is greater than the transmission range of the first networking technology. The third message may be translated to obtain a fourth message. Transmission of the second message and the fourth message may be scheduled such that the second message and the fourth message are transmitted sequentially without an overlap or interleave. That is to say, the second message may be completely transmitted before beginning transmission of the fourth message, or the fourth message may be completely transmitted before beginning transmission of the second message. The second message and the fourth message may be transmitted in accordance with the scheduling.

In one aspect, a third message may be received from the first device. The third message may be translated to obtain a fourth message, and the fourth message may be provided to the first client. The third message may be translated by associating the third message with a preceding communication from the first client, and translating the fourth message to a format consistent with the preceding communication, based on the associating.

In one aspect, a third message may be received from the first device. A fourth message corresponding to the third message may be transmitted to one or more other devices that communicate using the first networking technology.

In one aspect, the first message may be directed to a first group of devices comprising a plurality of target devices configured to use the first networking technology. A command may be determined for each device in the first group of devices based on content of the message, and commands corresponding to the devices are transmitted using the first networking technology. The first group of devices may include different types of devices. Different commands may be determined for the different types of devices.

In one aspect, the first message may be translated to obtain a second message by converting the first message from a first transmission format to a second transmission format.

In one aspect, the first wireless technology comprises a Bluetooth technology, an NFC technology, Wi-Fi or Powerline Ethernet.

Figure 14:
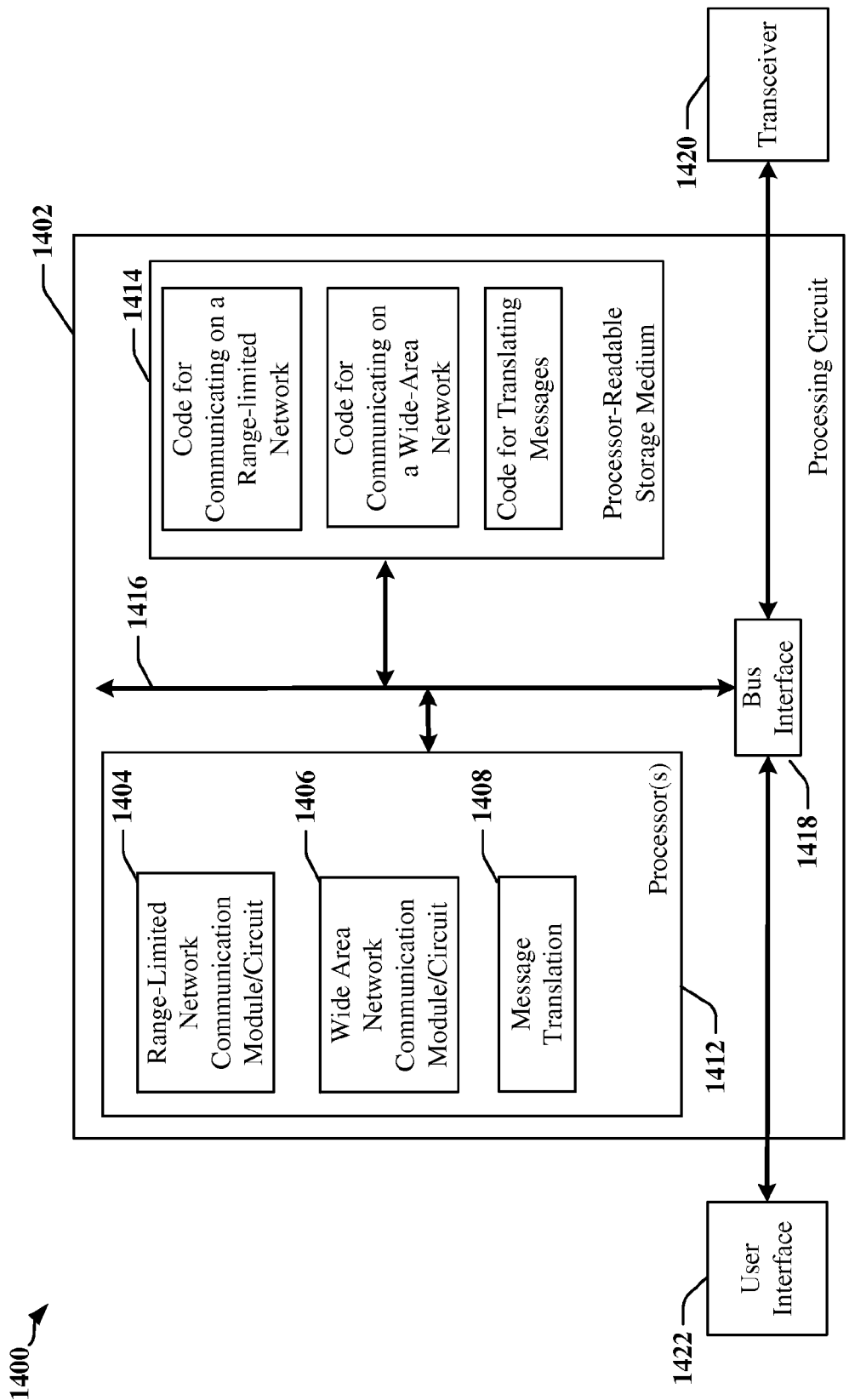
FIG. 14 is a diagram illustrating an example of a hardware implementation for an apparatus that may perform radio-agnostic message translation according to certain aspects disclosed herein.

FIG. 14 is a conceptual diagram illustrating an example of a hardware implementation for an apparatus 1400 employing a processing circuit 1402. In this example, the processing circuit 1402 may be implemented with a bus architecture, represented generally by the bus 1416. The bus 1416 may include any number of interconnecting buses and bridges depending on the specific application of the processing circuit 1402 and the overall design constraints. The bus 1416 links together various circuits including one or more processors, represented generally by the processor 1412, and computer-readable media, represented generally by the processor-readable storage medium 1414. One or more timers 1424 may be connected to the bus and/or may be directly accessible or embodied in a processor 1412. The bus 1416 may also link various other circuits such as timing sources, timers, peripherals, voltage regulators, and power management circuits. A bus interface 1418 provides an interface between the bus 1416 and a transceiver 1420. The transceiver 1420 provides a means for communicating with various other apparatus over a transmission medium. Depending upon the nature of the apparatus, a user interface 1422 (e.g., keypad, display, speaker, microphone, joystick) may also be provided.

The processor 1412 is responsible for managing the bus 1416 and general processing, including the execution of software stored on the processor-readable storage medium 1414. The software, when executed by the processor 1412, causes the processing circuit 1402 to perform the various functions described supra for any particular apparatus. The processor-readable storage medium 1414 may be used for storing data that is manipulated by the processor 1412 when executing software. The processor-readable storage medium 1414 may also be used for storing system information related to one or more remotely managed devices (e.g. profiles), and the apparatus 1400 itself.

In one configuration the processing circuit may include a range-limited network communications module or circuit 1404 configured to establish a connection with a device that communicates using a first networking technology that has a limited transmission range, a module or circuit 1406 for receiving a first message from a client through a connection established on a communications network, and a module or circuit 1408 for translating the first message to obtain a second message. The range-limited network communications module or circuit 1404 may be configured to transmit the second message to the device using the first networking technology. The client may be separated from the device by a distance that is greater than the transmission range of the first networking technology.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of communications by an apparatus, the method comprising:
    establishing a connection with a first device using a network interface compatible with a first communications technology that has a limited transmission range;
    receiving a first command message directed to a plurality of target devices from a first client through a connection established on a communications network, wherein the first client is separated from the first device by a distance that is greater than the limited transmission range of the first communications technology;
    based on a content of the first command message, translating the first command message to obtain a different second command message for each of the plurality of target devices, wherein the translating comprises converting the first command message from a first transmission format to a second transmission format;
    transmitting the second command message to the first device using the first communications technology when the first device is one of the plurality of target devices; and
    transmitting the second command message to a second device using a second communications technology that has a limited transmission range, when the second device is one of the plurality of target devices.

2. The method of claim 1, wherein addressing information of the first device is concealed from the first client.

3. The method of claim 1, further comprising:
    using the first communications technology to transmit the second command message to the plurality of target devices.

4. The method of claim 1, further comprising:
    receiving a third command message from a second client through a wide area network, wherein the second client is separated from the first device by a distance that is greater than the limited transmission range of the first communications technology;
translating the third command message to obtain a fourth command message; and
transmitting the second command message and the fourth command message such that the second command message and the fourth command message are transmitted sequentially without an overlap or an interleave.

5. The method of claim 1, further comprising:
receiving a third command message from the first device;
translating the third command message to obtain a fourth command message; and
providing the fourth command message to the first client.

6. The method of claim 5, wherein the translating the third command message comprises:
associating the third command message with a preceding communication from the first client; and
translating the fourth command message to a format consistent with the preceding communication, based on the associating.

7. The method of claim 1, further comprising:
receiving a third command message from the first device;
transmitting a fourth command message corresponding to the third command message to one or more other devices that communicate using the first communications technology.

8. The method of claim 1, further comprising:
determining the second command message for each device in the plurality of target devices based on the content of the first command message; and
transmitting the second command message to the each of the plurality of target devices using the first communications technology.

9. The method of claim 1, wherein the plurality of target devices comprises different types of devices, and wherein different second command messages are translated for the different types of devices.

10. The method of claim 1, wherein the first communications technology comprises a Bluetooth technology or a near field communications technology.

11. An apparatus configured for wireless communication, the apparatus comprising:
at least one processor;
a memory coupled to the at least one processor; and
first and second wireless communication interfaces coupled to the at least one processor, wherein the at least one processor is configured to:
establish a connection with a first device that communicates using a first communications technology that has a limited transmission range;
receive a first command message directed to a plurality of target devices from a first client through a connection established on a communications network, wherein the first client is separated from the first device by a distance that is greater than the limited transmission range of the first communications technology;
based on a content of the first command message, translate the first command message to obtain a different second command message for each of the plurality of target devices, wherein the translating comprises converting the first command message from a first transmission format to a second transmission format;
transmit the second command message to the first device using the first communications technology when the first device is one of the plurality of target devices; and
transmit the second command message to a second device using a second communications technology that has a limited transmission range, when the second device is one of the plurality of target devices.

12. The apparatus of claim 11, wherein addressing information of the first device is concealed from the first client.

13. The apparatus of claim 11, wherein the at least one processor is further configured to:
use the first communications technology to transmit the second command message to the plurality of target devices.

14. The apparatus of claim 11, wherein the at least one processor is further configured to:
receive a third command message from a second client through a wide area network, wherein the second client is separated from the first device by a distance that is greater than the limited transmission range of the first communications technology;
translate the third command message to obtain a fourth command message; and
transmit the second command message and the fourth command message such that the second command message and the fourth command message are transmitted sequentially without an overlap or an interleave.

15. The apparatus of claim 11, wherein the at least one processor is further configured to:
receive a third command message from the first device;
translate the third command message to obtain a fourth command message; and
provide the fourth command message to the first client.

16. The apparatus of claim 15, wherein the at least one processor is further configured to:
associate the third command message with a preceding communication from the first client; and
translate the fourth command message to a format consistent with the preceding communication, based on the associating.

17. The apparatus of claim 11, wherein the at least one processor is further configured to:
receive a third command message from the first device; and
transmit a fourth command message corresponding to the third command message to one or more other devices that communicate using the first communications technology.

18. The apparatus of claim 11, wherein the plurality of target devices comprises different types of devices, and
wherein different second command messages are translated for the different types of devices.

19. An apparatus configured for wireless communication, the apparatus comprising:
means for establishing a connection with a first device that communicates using a first communications technology that has a limited transmission range;
means for receiving a first command message directed to a plurality of target devices from a first client through a connection established on a communications network, wherein the first client is separated from the first device by a distance that is greater than the limited transmission range of the first communications technology;
means for translating the first command message based on a content of the first command message to obtain a different second command message for each of the plurality of target devices,
wherein the translating comprises converting the first command message from a first transmission format to a second transmission format;
means for transmitting the second command message to the first device using the first communications technology when the first device is one of the plurality of target devices; and
means for transmitting the second command message to a second device using a second communications technology that has a limited transmission range, when the second device is one of the plurality of target devices.

20. The apparatus of claim 19, wherein addressing information of the first device is concealed from the first client.

21. The apparatus of claim 19, wherein the means for transmitting the second command message is configured to use the first communications technology to transmit the second command message to the plurality of target devices.

22. The apparatus of claim 19, wherein:
the means for receiving is configured to receive a third command message from a second client through a wide area network, wherein the second client is separated from the first device by a distance that is greater than the limited transmission range of the first communications technology;
the means for translating is configured to translate the third command message to obtain a fourth command message; and
the means for transmitting is configured to transmit the second command message and the fourth command message such that the second command message and the fourth command message are transmitted sequentially without an overlap or an interleave.

23. The apparatus of claim 19, wherein:
the means for receiving is configured to receive a third command message from the first device;
the means for translating is configured to translate the third command message to obtain a fourth command message; and
the means for transmitting is configured to provide the fourth command message to the first client.

24. The apparatus of claim 23, wherein:
the means for establishing is configured to associate the third command message with a preceding communication from the first client; and
the means for translating is further configured to translate the fourth command message to a format consistent with the preceding communication, based on the associating.

25. The apparatus of claim 19, wherein:
the means for receiving is configured to receive a third command message from the first device;
the means for transmitting is configured to transmit a fourth command message corresponding to the third command message to one or more other devices that communicate using the first communications technology.

26. The apparatus of claim 19, wherein the plurality of target devices comprises different types of devices, and
wherein different second command messages are translated for the different types of devices.

27. A non-transitory computer-readable storage medium comprising code configured for:
establishing a connection with a first device that communicates using a first communications technology that has a limited transmission range;
receiving a first command message directed to a plurality of target devices from a first client through a connection established on a communications network, wherein the first client is separated from the first device by a distance that is greater than the limited transmission range of the first communications technology;
based on a content of the first command message, translating the first command message to obtain a different second command message for each of the plurality of target devices, wherein the translating comprises converting the first command message from a first transmission format to a second transmission format;
transmitting the second command message to the first device using the first communications technology when the first device is one of the plurality of target devices; and
transmitting the second command message to a second device using a second communications technology that has a limited transmission range, when the second device is one of the plurality of target devices.

\* \* \* \* \*